(12) United States Patent
Seo et al.

(10) Patent No.: US 12,436,725 B2
(45) Date of Patent: Oct. 7, 2025

(54) DISPLAY DEVICE AND ELECTRONIC DEVICE INCLUDING SAME

(71) Applicant: SAMSUNG ELECTRONICS CO., LTD., Suwon-si (KR)

(72) Inventors: Dongil Seo, Suwon-si (KR); Hokeun Kwak, Suwon-si (KR); Yongkwan Kim, Suwon-si (KR); Jaeheung Park, Suwon-si (KR); Dongok Choi, Suwon-si (KR); Sunhyoung Pyo, Suwon-si (KR); Min Heu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/796,202

(22) Filed: Aug. 6, 2024

(65) Prior Publication Data

US 2025/0138766 A1  May 1, 2025

Related U.S. Application Data

(63) Continuation of application No. PCT/KR2024/010903, filed on Jul. 26, 2024.

(51) Int. Cl.
G06F 3/14 (2006.01)
G02B 27/09 (2006.01)

(52) U.S. Cl.
CPC ........... *G06F 3/14* (2013.01); *G02B 27/0955* (2013.01)

(58) Field of Classification Search
CPC .............................. G02B 27/0955; G06F 3/14
See application file for complete search history.

(56) References Cited

U.S. PATENT DOCUMENTS 10,514,544 B1  12/2019  Yoon
10,859,812 B2  12/2020  Yeoh et al.
(Continued)

FOREIGN PATENT DOCUMENTS

CN  111999896 A  11/2020
CN  112433343 A  3/2021
(Continued)

OTHER PUBLICATIONS

International Search Report and Written Opinion for International Application No. PCT/KR2024/010903; International Filing Date Jul. 26, 2024; International Search Report Mail Date Oct. 28, 2024; 9 Pages.
(Continued)

*Primary Examiner* — Muhammad N Edun
(74) *Attorney, Agent, or Firm* — CANTOR COLBURN LLP

(57) ABSTRACT

A display device includes a display configured to output a screen image along a first direction, and a lens assembly including at least three lenses arranged sequentially along an optical axis and configured to focus or guide the screen output from the display in a predetermined direction/predetermined position. The lens assembly may be configured to reflect the screen output from the display at least twice between a first lens disposed farthest from the display and an $n^{th}$ lens disposed closest to the display. The display may be disposed to be movable in a direction crossing the first direction or the optical axis. The display device satisfies [Conditional expression 1: $0.02 \leq MD/DSP \leq 0.2$] regarding the diagonal length DSP of the display and the distance MD from the optical axis to the center of the display which is measured along a direction perpendicular to the optical axis.

20 Claims, 11 Drawing Sheets

(56) References Cited

U.S. PATENT DOCUMENTS

| | | | |
|---|---|---|---|
| 11,539,929 B1* | 12/2022 | Gao | G02B 27/4205 |
| 11,586,042 B2 | 2/2023 | Ha et al. | |
| 2016/0147069 A1* | 5/2016 | Tanaka | G02B 27/0176 |
| | | | 359/632 |
| 2017/0146714 A1 | 5/2017 | Ambur et al. | |
| 2017/0276952 A1 | 9/2017 | Huang | |
| 2019/0196157 A1 | 6/2019 | Kawamura et al. | |
| 2019/0384070 A1 | 12/2019 | Geng et al. | |
| 2021/0018955 A1 | 1/2021 | Ciou et al. | |
| 2021/0223548 A1 | 7/2021 | Maimone et al. | |
| 2022/0279158 A1* | 9/2022 | Hong | G02B 30/60 |
| 2023/0051085 A1 | 2/2023 | Lee et al. | |

FOREIGN PATENT DOCUMENTS

| | | |
|---|---|---|
| JP | 2022009837 A | 1/2022 |
| JP | 2023004538 A | 1/2023 |
| KR | 20170017608 A | 2/2017 |
| KR | 102419009 B1 | 7/2022 |
| KR | 20220123256 A | 9/2022 |
| KR | 20230024102 A | 2/2023 |
| WO | 2022081537 A3 | 6/2022 |

OTHER PUBLICATIONS

Hou, Q., et al.; Stray light analysis and suppression method of a pancake virtual reality head-mounted display; Optics Express; Nov. 2022; pp. 44918-44932; vol. 30, No. 25; Optica Publishing Group; Washington, DC. URL: https://doi.org/10.1364/OE.476078.

* cited by examiner

DISPLAY DEVICE AND ELECTRONIC DEVICE INCLUDING SAME

This application is a Continuation of International Application No. PCT/KR2024/010903, filed on Jul. 26, 2024, in the Korean Intellectual Property Receiving Office and claims priority to Korean Patent Application No. 10-2023-0143638, filed on Oct. 25, 2023, and Korean Patent Application No. 10-2023-0160973, filed on Nov. 20, 2023, and all the benefits accruing therefrom under 35 U.S.C. § 119, the contents of which in their entirety are herein incorporated by reference.

TECHNICAL FIELD

The invention relates to an electronic device, and more particularly, to a display device and/or an electronic device including the same.

BACKGROUND ART

A portable electronic device (e.g., an electronic scheduler, a portable multimedia player, a mobile communication terminal, or a tablet PC) is generally equipped with a display member (e.g., a display module) and a battery, and has a bar-type, folder-type, or sliding-type appearance due to the shape of the display member or the battery. Recently, as display members and batteries have been improved in performance and miniaturized, electronic devices that are wearable on a portion of a user's body, such as the wrist or head, or in the form of clothing (hereinafter, referred to as "wearable electronic devices") are emerging.

Some examples of wearable electronic devices include a head-mounted device (HMD), smart glasses, a smart watch (or band), a contact lens-type device, a ring-type device, a clothing/shoe/glove-type device, and the like. These wearable electronic devices can be easily carried thereby improving user accessibility.

As an example, the HMD is a device that is worn on a user's head or face which allows the user to view a virtual image in a three-dimensional space by projecting an image onto the user's retina. For example, the HMD may be classified into a see-through-type HMD which is configured to provide an augmented reality (AR) experience or a see-closed-type HMD which is configured to provide a virtual reality (VR) experience. The see-through-type HMD may be implemented, for example, in the form of glasses, and may provide information about buildings, objects, and the like within the user's field of view to the user in the form of an image or text. The see-closed-type HMD may output independent images to both eyes of the user and output content (a game, a movie, streaming, broadcasting, or the like) which is provided from a mobile communication terminal or from an external input to the user wearing the HMD, thereby providing an excellent sense of immersion. In addition, the HMD may be used to provide a mixed reality (MR) or extended reality (XR) experience, which are a mixture of augmented reality (AR) and virtual reality (VR).

Recently, product development related to the HMD is actively progressing, and the HMD is used for various purposes such as military, gaming, industrial, and medical purposes. Accordingly, there is a demand for HMDs that are capable of providing good image quality while being smaller and lighter.

The above information may be presented as related art for the purpose of assisting in understanding the disclosure.

DETAILED DESCRIPTION OF THE INVENTION

Technical Solution

According to the invention, a display device may include a display what is configured to output an image on a screen directed along a first direction, and a lens assembly which includes at least three lenses arranged sequentially along an optical axis and configured to focus or guide the screen output from the display in a predetermined direction or to a predetermined position. In an embodiment, the lens assembly may be configured to reflect the screen output from the display at least twice between a first lens disposed farthest from the display among the at least three lenses and an nth lens disposed closest to the display among the at least three lenses. In an embodiment, the display may be disposed to be movable in a direction which crosses the first direction or in a direction which crosses the optical axis. In an embodiment, the display device may satisfy [Conditional expression 1], shown below, regarding the diagonal length DSP of the display and the distance MD from the optical axis to the center of the display when measured along a direction which is perpendicular to the optical axis, where [Conditional expression 1] is given by:

$$0.02 <= MD/DSP <= 0.2.$$

According to an embodiment of the invention, an electronic device may include a first display device and a second display device disposed on one side of the first display device. In an embodiment, at least one of the first display device or the second display device may include a display which is configured to output an image on a screen directed along a first direction, and a lens assembly which includes at least three lenses arranged sequentially along an optical axis and configured to focus or guide the screen output from the display in a predetermined direction or to a predetermined position. In an embodiment, the lens assembly may be configured to reflect the screen output from the display at least twice between a first lens disposed farthest from the display among the at least three lenses and an nth lens disposed closest to the display among the at least three lenses. In an embodiment, the display may be disposed to be movable in a direction which crosses the first direction or in a direction which crosses the optical axis. In an embodiment, the electronic device, the first display device, and/or the second display device may satisfy the following [Conditional expression 1] and [Conditional expression 2], where [Conditional expression 1] and [Conditional expression 2] are given by:

$$0.02 <= MD/DSP <= 0.2, \quad \text{[Conditional expression 1]},$$

and $$0.2 <= (LD - DSP)/TTL <= 0.7, \quad \text{[Conditional expression 2]},$$

where, "DSP" may be the diagonal length of the display, "MD" may be the distance from the optical axis to the center of the display as measured along a direction which is perpendicular to the optical axis, "LD" may be the largest outer diameter among the outer diameters of the at least three lenses, and "TTL" may be the distance from the display to a first lens surface of the first lens on the optical axis, wherein the first lens surface may refer to a surface which is disposed opposite to a surface of the first lens facing the display.

BRIEF DESCRIPTION OF DRAWINGS

The above and other aspects, features, and/or advantages of the invention will be more apparent from the following detailed description taken in conjunction with the accompanying drawings.

MODE FOR CARRYING OUT THE INVENTION

Figure 1:
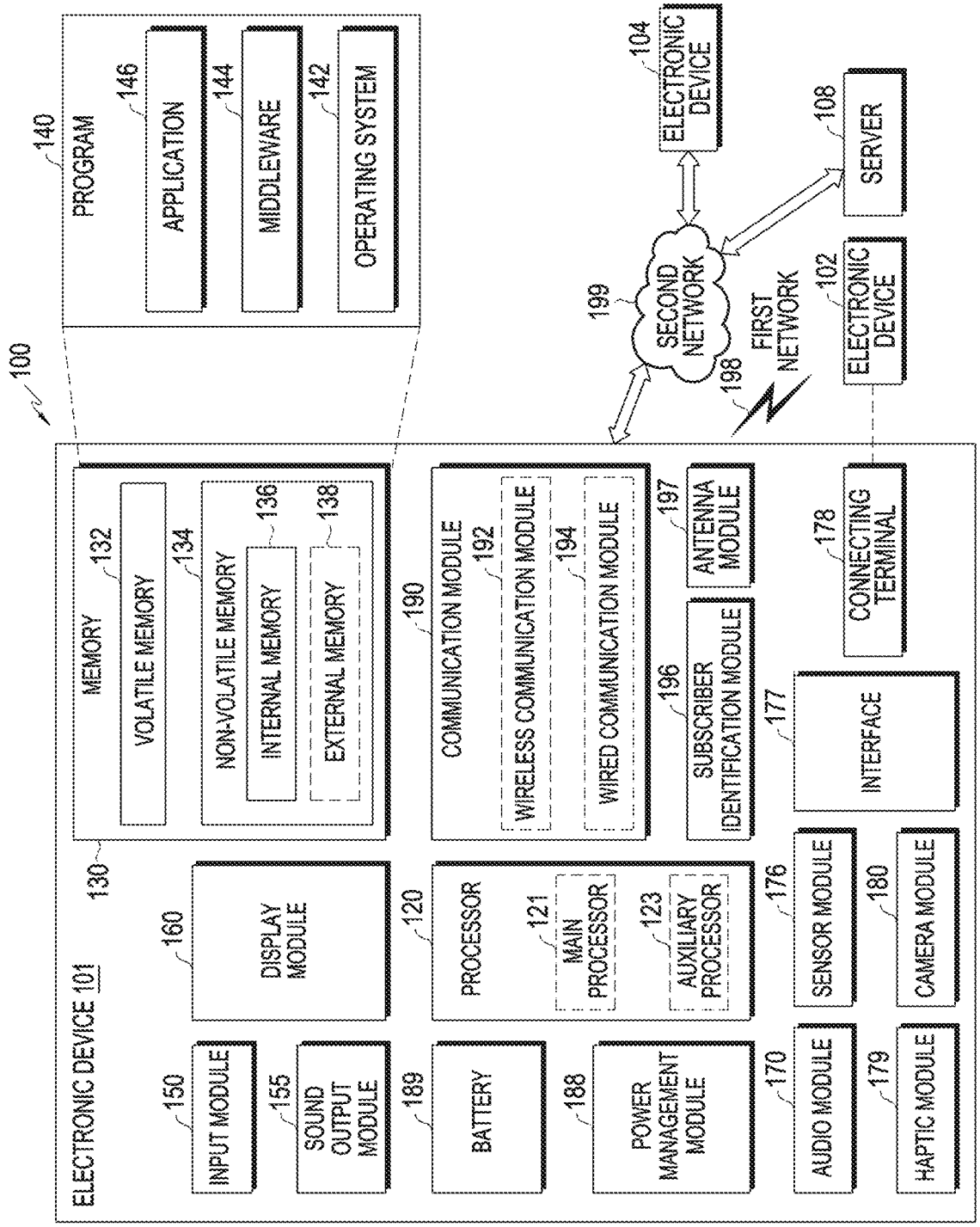
FIG. 1 is a block diagram illustrating an electronic device in a network environment, according to an embodiment.

In electronic devices that provide visual information while worn on a user's head or face, such as head-mounted wearable devices, there may be difficulties in providing a comfortable fit, reducing user fatigue, and providing good quality images. For example, when considering a fit or user fatigue, the specifications of displays or optical systems (e.g., lens assemblies) may be limited, which may make it difficult to provide high-quality images. Moreover, when a user's physical condition (e.g., facial shape) is taken into consideration, C-closed-type HMDs may have greater difficulties in satisfying user requirements regarding a fit or image quality. For example, with reference to both eyes, a person's horizontal viewing angle is about 200 degrees, but when implementing an electronic device (e.g., an HMD) that is capable of satisfying the user's viewing angle through a combination of a display and an optical system, it may be difficult to alleviate user fatigue.

An embodiment of the disclosure is to solve at least the above-described problems and/or disadvantages and provide at least the advantages to be described later, and to provide a display device that is capable of reducing user fatigue by providing a comfortable fit when worn, and/or an electronic device including the display device.

An embodiment of the disclosure is to provide a display device that is capable of implementing a high-quality image by providing a comfortable fit and having optical performance (e.g., a field of view) that matches a user's viewing angle, and/or an electronic device including the display device.

Advantageous effects obtainable from the disclosure may not be limited to the above-mentioned effects, and other effects which are not mentioned may be clearly understood, through the following descriptions, by those skilled in the art to which the disclosure pertains.

The following description made with reference to the accompanying drawings may be provided in order to help a comprehensive understanding of various implementations of the disclosure defined by the claims and equivalents thereof. An exemplary embodiment set forth in the following description includes various particular details to help the understanding, but is considered one of various embodiments. Therefore, it will be apparent to those skilled in the art that various changes and modifications may be made to various implementations described herein without departing from the scope and technical idea of the disclosure. In addition, descriptions of well-known functions and configurations may be omitted for clarity and brevity.

The terms and words used in the following description and claims are not limited to bibliographical meanings, but may be used to clearly and consistently describe the various embodiments set forth herein. Therefore, it will be apparent to those skilled in the art that the following description of various implementations of the disclosure is provided only for the purpose of explanation, rather than for the purpose of limiting the disclosure defined as the scope of protection and equivalents thereto.

It should be appreciated that a singular form such as "a," "an," or "the" also includes the meaning as a plural form, unless the context clearly indicates otherwise. Therefore, for example, "a component surface" may mean one or more of component surfaces.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
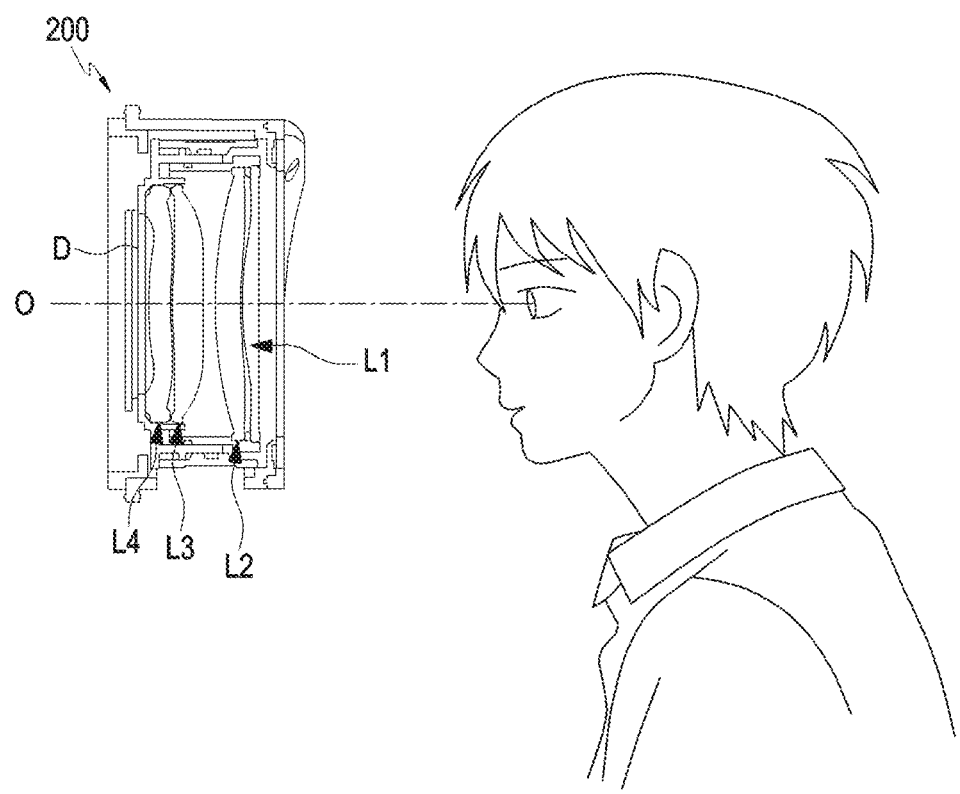
FIG. 2 is a graphical illustration illustrating a wearable electronic device and a user, according to an embodiment.

FIG. 2 is a view illustrating a wearable electronic device 200, according to an embodiment.

In describing an embodiment of the invention, some numerical values may be presented, but it is to be noted that these values do not limit the embodiment of the disclosure unless specifically described in the claims.

In an embodiment and referring to FIG. 2, the wearable electronic device 200 (e.g., the electronic device 101 in FIG. 1) is an electronic device that may be wearable on a user's head or face, where the user is capable of visually recognizing surrounding objects or environments while wearing the wearable electronic device 200. The wearable electronic device 200 may use a camera module to acquire and/or recognize a visual image of an object or environment at which the user is looking or that is located in the direction in which the wearable electronic device 200 is oriented, and may receive information about the object or environment from an external electronic device via a network. The wearable electronic device 200 may provide the user with the received information about the object or environment in an acoustic or visual form. For example, the wearable electronic device 200 may provide the received information about the object or environment to the user in a visual form by using a display member such as a display module. By implementing information about the object or environment in a visual form and combining the visual image with an actual image (or video) of the environment surrounding the user, the wearable electronic device 200 may implement an augmented reality (AR), virtual reality (VR), mixed reality (MR), and/or extended reality (XR) interface to the user. The display member may provide the user with information about objects or environments surrounding the user by outputting a screen in which an augmented reality object is added to the actual image (or video) of the environments of the user.

According to an embodiment, all or some of the operations executed in the electronic device 101 or the wearable electronic device 200 may be executed in one or more external electronic devices 102, 104, or 108. For example, when the electronic device 101 or the wearable electronic device 200 is to execute certain functions or services automatically or in response to a request from a user or another device, the electronic device 101 or the wearable electronic device 200 may request the one or more external electronic devices 102, 104, and 108 to execute at least some of the functions or services, in place of or in addition to executing the functions or services by itself. The one or more external electronic devices 102, 104, and 108, which have received the above-mentioned request, may execute at least some of the requested functions or services, or additional functions or services associated with the request, and may transmit the result of the execution to the electronic device 101 or the wearable electronic device 200. The electronic device 101 or the wearable electronic device 200 may provide the result as part of a response to the request as it is, or it may further process the result and provide the processed result as at least part of a response to the request. For example, the external electronic device 102 may render content data executed in an application and then may transmit the content data to the electronic device 101 or the wearable electronic device 200, where the electronic device 101 or the wearable electronic device 200, which receives the content data, may output the content data to a display module. When the electronic device 101 or the wearable electronic device 200 detects the user's motion via sensors such as an inertial measurement unit sensor, a processor (e.g., the processor 120 in FIG. 1) of the electronic device 101 or the wearable electronic device 200 may correct the rendered data received from the external electronic device 102, based on the motion information, and output the corrected data to the display module. In another embodiment, when the user's motion is detected through the sensors, the processor (e.g., the processor 120 in FIG. 1) of the electronic device 101 or the wearable electronic device 200 may transmit the motion information to the external electronic device 102 and request that the motion information be rendered such that screen data is undated according to the motion information. According to various embodiments, the external electronic device 102 may be any of various types of devices, such as a case device capable of storing and charging the electronic device 101.

In the following detailed description, "a state or location in which an electronic device or a predetermined component of the electronic device faces a user's face" may be variously described, and it is to be noted that the detailed description describes an embodiment where the user is wearing the wearable electronic device 200.

According to an embodiment, the wearable electronic device 200 may include at least one display member and a wearing member. Depending on the structure of the display member, the wearable electronic device 200 may further include a structure for mounting or for supporting the display member (e.g., a lens frame). A pair of display members including a first display member and a second display member may be provided, in which the first display member and the second display member may be disposed to correspond to the user's right eye and left eye, respectively, while in the state in which the wearable electronic device 200 is worn on the user's body. In an embodiment, the wearable electronic device 200 may include a housing shape having a single display member which corresponds to the right eye and the left eye of the user (e.g., a goggle-like shape).

According to an embodiment, the display member is a component which is provided in order to provide visual information to a user, and may include, for example, a display D, a plurality of lenses L1, L2, L3, and L4 (e.g., a lens assembly), and/or at least one sensor. Here, each of the lens assembly and the display D may be transparent or translucent. However, the display member is not limited to this. In an embodiment, the display member may include a window member, where the window member may be translucent glass or may be a member having a light transmittance that is adjustable by adjusting the coloring concentration thereof.

According to an embodiment, the display member may include a lens having a waveguide or a reflective lens and may provide visual information to a user by forming an image output from a light output device (e.g., a projector or a display D) on each lens. For example, the display member may refer to a display that may include a waveguide (e.g., a light waveguide) in at least a portion of each of the lenses and that is capable of transmitting an image (or light beams) output from the light output device to a user's eyes through the waveguides included therein as well as transmitting an image of the real world to the user's eyes through the area in a see-through manner. In another embodiment, the waveguides may be understood as part of the lens assembly. As in the lens assembly LA of FIG. 5 or FIG. 6 to be described later, the waveguides may be omitted in a display member in which a plurality of lenses (e.g., L1, L2, L3, and L4) and a reflective member are combined.

Figure 5:
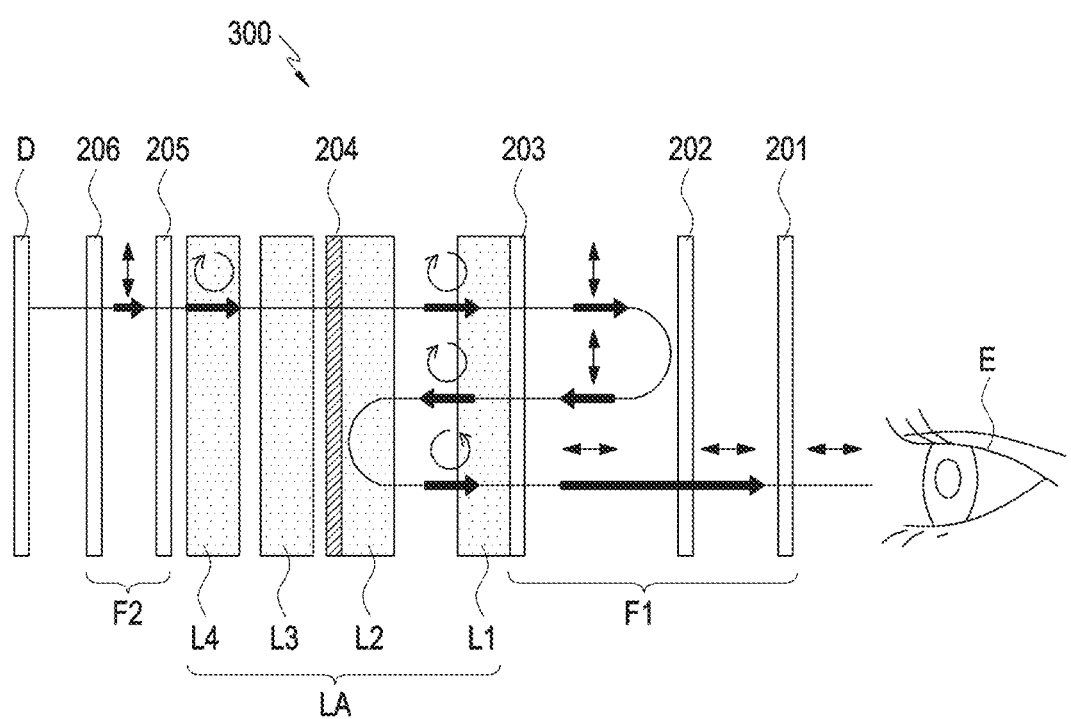
FIG. 5 is a graphical display illustrating a path through which light beams output by a display are focused or guided to a user's eyes in a wearable electronic device, according to an embodiment.
Figure 6:
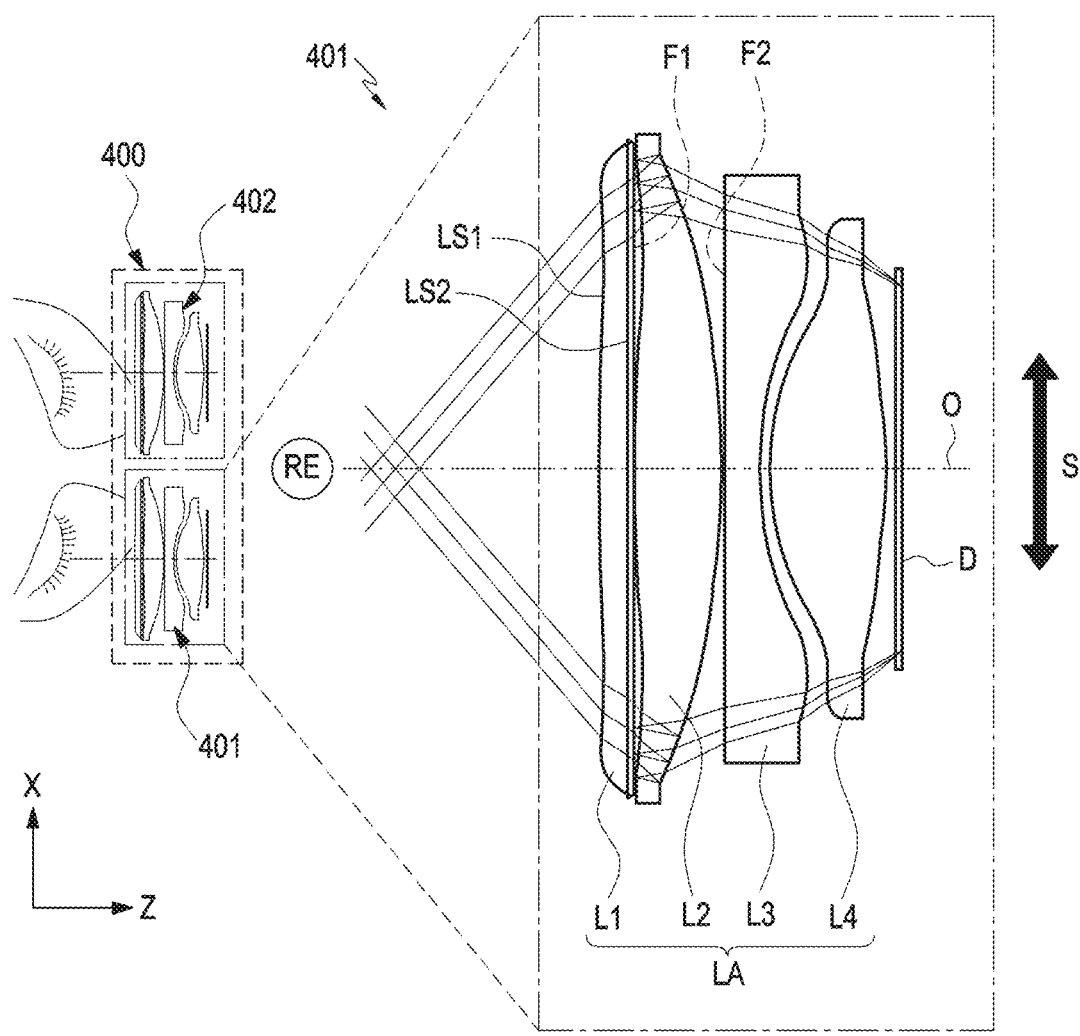
FIG. 6 is a graphical display illustrating a wearing state of a display device/electronic device including the displays, according to an embodiment.

According to an embodiment, the lens assembly LA has a configuration that includes a plurality of lenses (e.g., L1, L2, L3, and L4) but that does not include a waveguide, and may be disposed in a space within the wearable electronic device 200 to be in alignment with an optical axis (e.g., the optical axis O in FIG. 6). The configuration in which visual information output from a display D is provided to a user's eyes through the lens assembly will be discussed again below with reference to FIG. 5.

Figure 3:
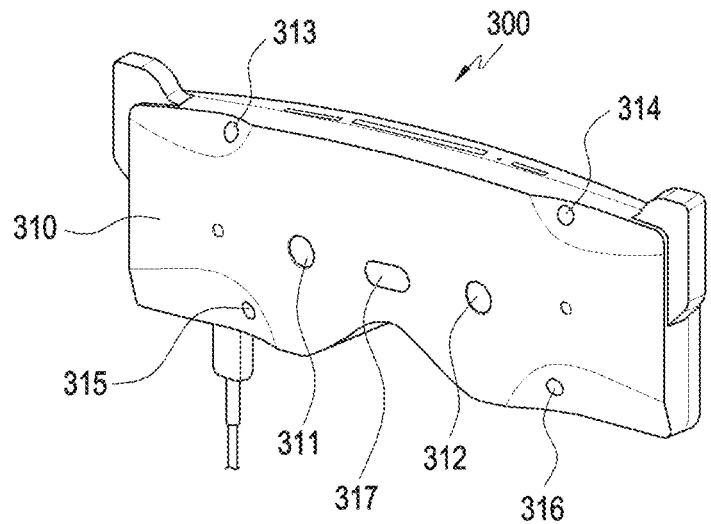
FIG. 3 is a perspective view illustrating the front side of a wearable electronic device, according to an embodiment.
Figure 4:
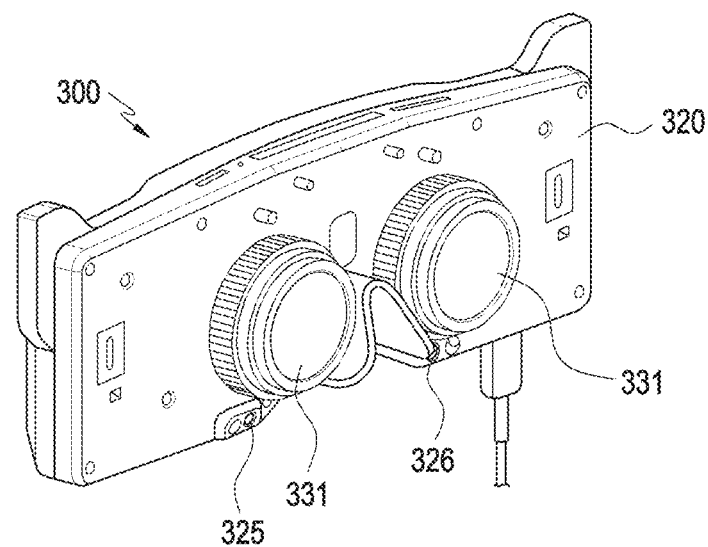
FIG. 4 is a perspective view illustrating the rear side of a wearable electronic device, according to an embodiment.

FIGS. 3 and 4 are views illustrating the front and rear sides of a wearable electronic device 300, according to an embodiment.

In an embodiment and referring to FIGS. 3 and 4, camera modules 311, 312, 313, 314, 315, and 316 and/or a depth sensor 317 configured to acquire information related to the environment surrounding the wearable electronic device 300 may be provided and may be disposed on a first surface 310 of the electronic device 300 (e.g., a housing).

In an embodiment, the camera modules 311 and 312 may acquire images related to the environment surrounding the wearable electronic device.

In an embodiment, the camera modules 313, 314, 315, and 316 may acquire images while the wearable electronic device is worn by a user. The camera modules 313, 314, 315, and 316 may be used for hand detection and tracking, or user gesture (e.g., hand gesture) recognition. The camera modules 313, 314, 315, and 316 may also be used for 3-degree-of-freedom (3DoF) or 6-degree-of-freedom (6DoF) head tracking, position (space, environment) recognition, and/or movement recognition. In an embodiment, the camera modules 311 and 312 may be used for hand detection and tracking, or recognition or detection of a user gesture.

In an embodiment, the depth sensor 317 may be configured to transmit a signal and receive a signal reflected from a subject/object, and may be used to identify the distance to an object, such as time of flight (TOF). Instead of or in addition to the depth sensor 317, the camera modules 313, 314, 315, and 316 may identify the distance to an object.

According to an embodiment, face recognition camera modules 325 and 326 and/or displays 331 (and/or lenses) may be disposed on a second surface 320 of the housing.

In an embodiment, the face recognition camera modules 325 and 326 disposed adjacent to the displays may be used to recognize a user's face, or may be used to recognize and/or track one or both of a user's eyes.

In an embodiment, the displays 331 (and/or lenses) may be disposed on the second surface 320 of the wearable electronic device 300. In an embodiment, the displays 331 (and/or lenses) may be at least partially similar to or substantially the same as the displays D (and/or lenses L1, L2, L3, and L4) of FIG. 2. In an embodiment, the wearable electronic device 300 may not include the camera modules 315 and 316 among the plurality of camera modules 313, 314, 315, and 316. Although not illustrated in FIGS. 3 and 4, the wearable electronic device 300 may further include at least one of the components illustrated in FIGS. 1 and/or FIG. 2.

In an embodiment, the displays 331 may be understood as including a display module (e.g., the display module 160 in FIG. 1) that outputs a screen, and a lens assembly that focuses the output screen to a user's eyes. In FIG. 4, it is to be noted that, in the structure of the displays 331, reference numerals are assigned to portions visible from the exterior of the wearable electronic device 300 and are indicated to the lenses that are disposed closest to a user's eyes.

As described above, according to an embodiment, the wearable electronic device 300 may have a form factor to be worn on a user's head. The wearable electronic device 300 may further include a strap and/or a wearing member to be fixed on a portion of a user's body. The wearable electronic device 300 may provide a user experience based on an augmented reality, virtual reality, and/or mixed reality interface while worn on a user's head.

FIG. 5 illustrates a path through which light beams output by a display D are focused or guided to a user's eyes E in the wearable electronic device 300, according to an embodiment.

In an embodiment and referring further to FIG. 5 together with FIG. 2, the wearable electronic device 300 may include a display D, a lens assembly LA (e.g., a plurality of lenses L1, L2, L3, and L4), one or more quarter-wave plates (QWPs) 203 and 205, at least one reflective polarizer (RP) 202, and/or at least one beam splitter 204. In an embodiment, the one or more quarter-wave plates 203 and 205, the at least one reflective polarizer 202, and/or the at least one beam splitter 204 are to be understood as being part of the lens assembly LA. In an embodiment, at least one of the plurality of lenses L1, L2, L3, and L4 may be movable to provide a vision correction function to a user by adjusting a diopter.

According to an embodiment, the one or more quarter-wave plates 203 and 205, the at least one reflective polarizer 202, and the at least one beam splitter 204 may extend and/or may adjust a light propagation path length between the user's eyes E and the display D. For example, by implementing a focal length longer than the mechanical or physical length of the lens assembly LA, the lens assembly LA may provide good quality images to the user while being mounted on an electronic device that is small enough to be worn on the user's face. Wearable electronic devices (e.g., AR/VR glasses) are limited in size and weight due to the actual usage environment (e.g., use in the worn state), which may limit the resolution of virtual images that are output and may make it difficult to provide good quality images to a user even through an optical system. According to an embodiment, the wearable electronic device 300 may increase the optical path length of incident light beams relative to the external size, and/or may improve the resolution of images provided to the user by including an optical system (e.g., the lens assembly LA) with a pancake lens structure. For example, the wearable electronic device 300 may serve as an optical device (e.g., AR/VR glasses) that provides visual information while being worn on a user's head or face by including the display D and the lens assembly LA.

According to an embodiment, the display D may include a screen display area, which exposes visual information to a portion which corresponds to a user's both eyes when the user wears the wearable electronic device 300. In an embodiment, the wearable electronic device 300 may include a pair of displays D which corresponds to a user's both eyes. The display device D may include, for example, a liquid crystal display (LCD), a light-emitting diode (LED) display, an organic light-Emitting diode (OLED) display, a micro-OLED display, a micro-LED display, a microelectromechanical system (MEMS) display, or an electronic paper display. In an embodiment, an organic light-emitting diode display may be a display implemented on a silicon wafer (e.g., an OLED-on-silicon (OLEDoS) display). For example, the display D may display various contents (e.g., texts, images, videos, icons, symbols, or the like) provided to a user as visual information.

According to an embodiment, various contents (e.g., texts, images, videos, icons, or symbols, or the like) output in the form of light beams from the display D may pass through the one or more quarter-wave plates 203 and 205, the at least one reflective polarizer 202, the at least one beam splitter 204, and/or the lens assembly LA to be provided to the user's eyes. The order in which light beams pass through the one or more quarter-wave plates 203 and 205, the at least one reflective polarizer 202, the at least one beam splitter 204, and/or the lens assembly LA may be configured in various ways depending on various embodiments.

According to an embodiment, a first quarter-wave plate 203 and the reflective polarizer 202 may be disposed on the user's eye side surface of the two surfaces of the first lens L1 (hereinafter, referred to as a "first lens L1") from the user's eyes E in the lens assembly LA, and the beam splitter 204 may be disposed on one of the two surfaces of the first lens L1 or the second lens L2 (hereinafter, referred to as a "second lens L2") disposed away from the user's eyes E. For example, in the illustrated embodiment, the beam splitter 204 may be disposed on the display side surface of the second lens L2, and in another embodiment to be described later, the beam splitter may be disposed on the display side surface of the first lens L1. Here, the description "disposed on XX" may refer to being disposed adjacent to or to be substantially in contact with XX. For example, the beam splitter 204 may be disposed adjacent to the display side surface of the first lens L1 or the second lens L2, or may be provided to be substantially in contact with the display side surface of the first lens L1 or the second lens L2.

In the illustrated embodiment, among the plurality of lenses (e.g., at least three lenses), the first lens L1 of the wearable electronic device 300 or the lens assembly LA may be understood as the lens which is disposed farthest from the display D or the lens which is disposed closest to the user's eyes E. It is to be noted, however, that the invention is not limited thereto. For example, although not illustrated, the wearable electronic device 300 or the lens assembly LA may further include a transmissive optical member disposed farther from the display D than the first lens L1. In an embodiment, the transmissive optical member may have a refractive power that does not affect the optical performance of the wearable electronic device 300 and/or the lens assembly LA, and which will be described later. In an embodiment, the transmissive optical member disposed farther from the display D than the first lens L1 may have a transmittance of about 90% or more for visible light beams. In an embodiment, the transmissive optical member may have a transmittance close to about 100% for visible light beams. In the illustrated embodiment, reference numeral "201" is indicated to exemplify a first polarizer, but in another embodiment, the first polarizer may be omitted. In a structure in which the first polarizer is omitted, reference numeral "201" may be understood as indicating the above-described transmissive optical member. In an embodiment, the transmissive optical member may be disposed between the first lens L1 and the first polarizer 201 or between the reflective polarizer 202 and the first polarizer 201.

In an embodiment, FIG. 5 illustrates that the first quarter-wave plate 203 and/or the reflective polarizer 202 are disposed adjacent to (or substantially in contact with) the user's eye side surface of the two surfaces of the first lens L1, and that the beam splitter 204 is disposed adjacent to (or substantially in contact with) the display side surface of the second lens L2 (or the first lens L1). In an embodiment, the reflective polarizer 202 may be configured in the form of a film, laminated with the first quarter-wave plate 203 to form a first film section F1 (or a first polarizing plate), and attached to the first lens L1 to be disposed away from the user's eyes. Here, the term "laminated" may mean that two different members are bonded to each other with an adhesive provided on at least one of the members. In an embodiment, when the first quarter-wave plate 203 and/or the reflective polarizer 202 is disposed to be in contact with a lens (e.g., the first lens L1) (e.g., when attached to one surface of the first lens L1), the surface of the first lens L1, which is in contact with the first quarter-wave plate 203 and/or the reflective polarizer 202, may be implemented as a substantially flat surface.

According to an embodiment, the first film section F1 in the form in which the first quarter-wave plate 203 and the reflective polarizer 202 are laminated may be thinner and may have more excellent optical performance than the film section with a simple stacked structure. According to an embodiment, as illustrated in FIG. 5, the wearable electronic device 300, the lens assembly LA, and/or the first film section F1 may further include at least one separately provided polarizing film (e.g., the first polarizer 201), and may further include at least one anti-reflection (AR) film (not illustrated) in addition to or in place of the polarizing film. In an embodiment, when the wearable electronic device 300 and/or the lens assembly LA further includes a transmissive optical member (not illustrated), the transmissive optical member may be disposed between the reflective polarizer 202 and the first polarizer 201. For example, the first polarizer 201 may be understood to be part of the first film section F1 or to be a component independent of the first film section F1.

According to an embodiment, a liquid crystal display, an organic light-emitting diode display, and/or a micro-LED display may provide good quality images by including a polarizer. In an embodiment, when the lens assembly LA further includes the first film section F1 and/or the first polarizer 201, the image quality recognized by the user may be enhanced even when the display D outputs images having the same quality. In another embodiment, when combined with the lens assembly LA including the first film section F1, the second film section F2, and/or the first polarizer 201, some polarizing plates may be omitted from the display D and implemented with an organic light-emitting display or a micro-LED display. In an embodiment, the lens assembly LA may include the first film section F1 and/or the first polarizer 201, and the display D may include a polarizing plate.

Referring to FIG. 5, the first film section F1 (or a polarizing plate) may be disposed closer to the user's eyes E than the lens assembly LA to selectively transmit, reflect, and/or block light beams (e.g., the light beams output from the display D) entering the user's eyes. The beam splitter 204 may be disposed between the lenses of the lens assembly LA, for example, between the first lens L1 and the second lens L2 or between the second lens L2 and the third lens L3. The beam splitter 204 may be configured to transmit some of the light beams that are incident on the beam splitter 204 and reflect the remainder of the incident light beams. For example, the beam splitter 204 may be configured to transmit about 50% of the light beams and reflect about 50% of the light beams. In an embodiment, the beam splitter 204 may be configured as, for example, a semi-transparent mirror, and may be configured in the form of a mirror obtained by applying a coating to one surface of the first lens L1 or the second lens L2. Hereinafter, based on the functional aspect in which light beams are reflected, the reflective polarizer 202 may be referred to as a "first reflective member" and the beam splitter 204 may be referred to as a "second reflective member".

In the following description, the direction from the user's eyes E toward the display D may be referred to as a first direction, and the direction from the display D toward the user's eyes E, which is opposite to the first direction, may be referred to as a second direction. The first direction and the second direction may be substantially parallel to the optical axis O. The lens assembly LA may include a plurality of lenses (e.g., the first lens L1, the second lens L2, the third lens L3, and the fourth lens L4) which are sequentially arranged along the first direction.

According to an embodiment, the wearable electronic device 300 may include a second film section F2 (e.g., a second polarizing plate) which is disposed at a position which is farther from the user's eyes E than the lens assembly LA to selectively transmit, reflect, and/or block light beams entering the lens assembly LA. In the illustrated embodiment, the second film section F2 may be illustrated as being disposed between the display D and the lens assembly LA (e.g., the fourth lens L4), and in the embodiment to be described later, the second film section F2 may be illustrated as being disposed between the first lens L1 and the second lens L2. For example, the second film section F2 may be disposed at any position between the display D and the first lens L1.

According to an embodiment, the second film section F2 may include a second quarter-wave plate 205 and a second polarizer 206. As in the first film section F1, the second quarter-wave plate 205 and the polarizer 206 may be combined to implement the second film section F2. As mentioned above, for the purpose of distinguishing components, the quarter-wave plate 203 of the above-described first film section F1 may be referred to as a first quarter-wave plate 203, and the quarter-wave plate 205 of the second film section F2 may be referred to as a second quarter-wave plate 205. In addition, the polarizer 206 of the second film section F2 may be referred to as a second polarizer 206 to distinguish it from the first polarizer 201 included in the first film section F1.

According to an embodiment, when the first film section F1 is disposed adjacent to (or in contact with) the nth lens (wherein "n" is a natural number), the second film section F2 may be disposed on an (n+1)th lens disposed adjacent to the nth lens. The description "disposed on the (n+1)th lens" may be understood as the second film section F2 being disposed adjacent to or in contact with one of the surfaces of the (n+1)th lens. In an embodiment, the nth lens may be understood as the lens (e.g., the first lens L2) which is disposed the farthest from the display D among the lenses L1, L2, L3, and L4 of the lens assembly LA. The second film section F2 may be substantially bonded to one of the surfaces of the (n+1)th lens. The surface of the (n+1)th lens, to which the second film section F2 is attached, may be a substantially flat surface. As will be described later, when the first film section F2 including the first reflective member (e.g., the reflective polarizer 202) is disposed on the user's eye side surface of the first lens L1, the second reflective member (e.g., the beam splitter 204) may be disposed on the display side surface of the first lens L1, and the second film section F2 may be disposed on the user's eye side surface of the second lens L2. In an embodiment, the second film section F2 may be disposed on the display side surface of the second lens L2.

According to an embodiment, the arrangement of the film sections F1 and F2 and/or the beam splitter 204 may provide good quality images while miniaturizing an optical system that is implemented with a limited number of lenses (e.g., at least 3 lenses). For example, by reducing the number of lenses (or the number of lens surfaces) disposed between the reflective polarizer 202 as the first reflective member and the beam splitter 204 as the second reflective member, it is possible to suppress refraction or scattering in the path of reflected light beams, and/or birefringence due to manufacturing errors. As previously mentioned, as refraction or scattering increases in the path from a display D to a user's eyes E, it is difficult to stabilize optical performance or image quality.

According to an embodiment, the wearable electronic device 300 may operate as follows. The light beams that are output from the display D may pass through the second film section F2, the lens assembly LA, and the first film section F1, and then reach and be incident on the user's eyes E. In this case, the second polarizer 206 of the second film section F2 may transmit first linearly polarized light beams, for example, vertically polarized light beams (or p-polarized light beams), and may not transmit second linearly polarized light beams, for example, horizontally polarized light beams (or s-polarized light beams). For example, among the light beams reaching the second polarizer 206, only the vertically polarized light beams (or p-polarized light beams) may pass through the second polarizer. The light beams passing through the second polarizer 206 may be converted into circularly polarized light beams (right-circularly polarized light beams or left-circularly polarized light beams) by the second quarter-wave plate 205, and the circularly polarized light beams may pass through the lens assembly LA and the beam splitter 204 and then reach the first quarter-wave plate 203. The circularly polarized light beams reaching the first quarter-wave plate 203 may be converted back into linearly polarized light beams (e.g., vertically polarized light beams (or p-polarized light beams) while passing through the first quarter-wave plate 203 and then reach the reflective polarizer 202. The light beams may move in the second direction (from the display D to the user's eyes E) until reaching the reflective polarizer 202. The light beams reaching the reflective polarizer 202 may be reflected by the reflective polarizer 202 to be oriented in the first direction (from the user's eyes E to the display D) and then converted into circularly polarized light beams (right-circularly polarized light beams or left-circularly polarized light beams). The circularly polarized light beams (right-circularly polarized beams or left-circularly polarized beams) may be reflected by the beam splitter 204 to be oriented in the second direction again. In this case, phase conversion may be executed (e.g., left-circularly polarized light beams may be converted into right-circularly polarized light beams, and right-circularly polarized light beams may be converted into left-circularly polarized light beams). The phase-converted circularly polarized light beams may pass through the first quarter-wave plate 203 and the reflective polarizer 202 to travel along the second direction and reach the user's eyes E. At this time, the light beams passing through the first quarter-wave plate 203 may be converted into horizontally polarized light beams (or s-polarized light beams) and may reach the user's eyes E. However, FIG. 5 illustrates a change in the state of light beams passing through the wearable electronic device 300 according to an embodiment and by way of an example, in which it is to be noted that the conversion of polarized components, by the reflective polarizer 202, the quarter-wave plates 203 and 205, the beam splitter 204, and/or the second polarizer 206, may differ from those in the above-mentioned embodiment.

The embodiment of FIG. 5 illustrates the optical path from the display D to the user's eyes E or the polarized states of light beams that are passing through (or reflected by) the film sections F1 and F2 or the beam splitter 204. For convenience of description regarding the optical path or polarized states, FIG. 5 illustrates the second film section F2 as being disposed on the fourth lens L4, but the invention is not limited thereto. In another embodiment, the first film section F1 and the second film section F2 may be disposed between two adjacent lenses (e.g., the first lens L1 and the second lens L2), and the beam splitter 204 may be disposed between the first film section F1 and the second film section F2.

In embodiments to be described later, reference numerals for lens surfaces may not be written directly on the drawings for the sake of brevity of the drawings. When referring to the lens surfaces, a surface oriented toward or facing the display may be referred to as a "sensor side surface" or a "display side surface", and a surface directed opposite to the "sensor side surface" or the "display side surface" and oriented toward the user's eyes may be referred to as a "subject side surface" or an "eye side surface". For example, even when reference numerals in the drawings are omitted, a person ordinarily skilled in the art will easily understand the direction in which the lens surfaces are oriented with reference to the state illustrated in the drawings.

FIG. 6 illustrates display devices 401 and 402 and/or an electronic device 400 (e.g., the electronic device 101 of FIG. 1 and/or the wearable electronic device 200 or 300 in FIGS. 2 to 5) including the display devices in the worn state, according to an embodiment.

In an embodiment and referring to FIG. 6, the electronic device 400 is a wearable electronic device that is wearable on a user's face and that may include a first display device 401 and a second display device 402. For example, the first display device 401 may be configured (or disposed) to provide visual information to a user's eye RE (e.g., the right eye), and the second display device 402 may be configured (or disposed) to provide visual information to a user's left eye (e.g., the left eye LE in FIG. 11). In an embodiment, the first display device 401 and the second display device 402 may have substantially the same configuration and may be disposed to be laterally symmetrical with respect to each other when disposed on the user's face or inside the electronic device 400. An augmented reality, virtual reality, mixed reality and/or extended reality interface may be implemented by images provided independently from the first display device 401 and a second display D or images provided from the first display device 401 and a second display D which are synchronized.

According to an embodiment, each display device 401 or 402 may include a display D and a lens assembly LA. The display D may be configured to output a screen output along a first direction, for example, toward a user's eye RE, and may be substantially the same or at least partially the same as the display module 160 of FIG. 1, or the displays D or 331 of FIGS. 2 and 3 and/or FIG. 5. The lens assembly LA may include at least three lenses L1, L2, L3, and L4 which are aligned along the optical axis O. In the illustrated embodiment, the lens assembly LA is illustrated as including four lenses, and the at least three lenses L1, L2, L3, and L4 may be distinguished by writing ordinal numbers according to the order in which they are arranged. For example, the lens that is disposed farthest from the display D may be referred to as a first lens L1, and the lens that is disposed closest to the display D may be referred to as an nth lens. In the embodiment of FIG. 6, the nth lens may be understood as a fourth lens L4.

According to an embodiment, the lens assembly LA focuses (or guides) a screen output from the display D in a predetermined direction or to a position by using a combination of the at least three lenses L1, L2, L3, and L4. For example, a screen output from the display D may be focused on a user's eye RE via the lens assembly LA. In an embodiment, when guiding a screen output from the display D to a user's eye RE, the lens assembly LA may be configured to reflect the light beams (e.g., the screen output from the display D) at least twice between the first lens L1 and the nth lens L4. For example, the lens assembly LA may include at least one quarter wave plate, at least one reflective polarizer, or at least one beam splitter. In an embodiment, in the structure that reflects light beams (e.g., a screen output from the display D) at least twice between the first lens L1 and the nth lens L4, the lens assembly LA may be understood as including the film sections F1 and F2 and/or the beam splitter illustrated in FIG. 5. For example, the first film section L1 of FIG. 5 may be disposed on the second lens surface LS2 (e.g., the display D side surface) of the first lens L1, and the second film section F2 may be disposed on the eye side surface of the third lens L3. In an embodiment, the beam splitter 204 of FIG. 5 may be disposed on one of the lens surfaces of the second lens L2. In an embodiment, the beam splitter 204 of FIG. 5 may be understood as being disposed between the first lens L1 and the second lens L2 in FIG. 6 or between the second lens L2 and the third lens L3 in FIG. 6. As a result, the lens assembly LA may be made smaller in appearance and the length of the light path from the display D to the user's eye RE may be sufficiently secured.

Figure 7:
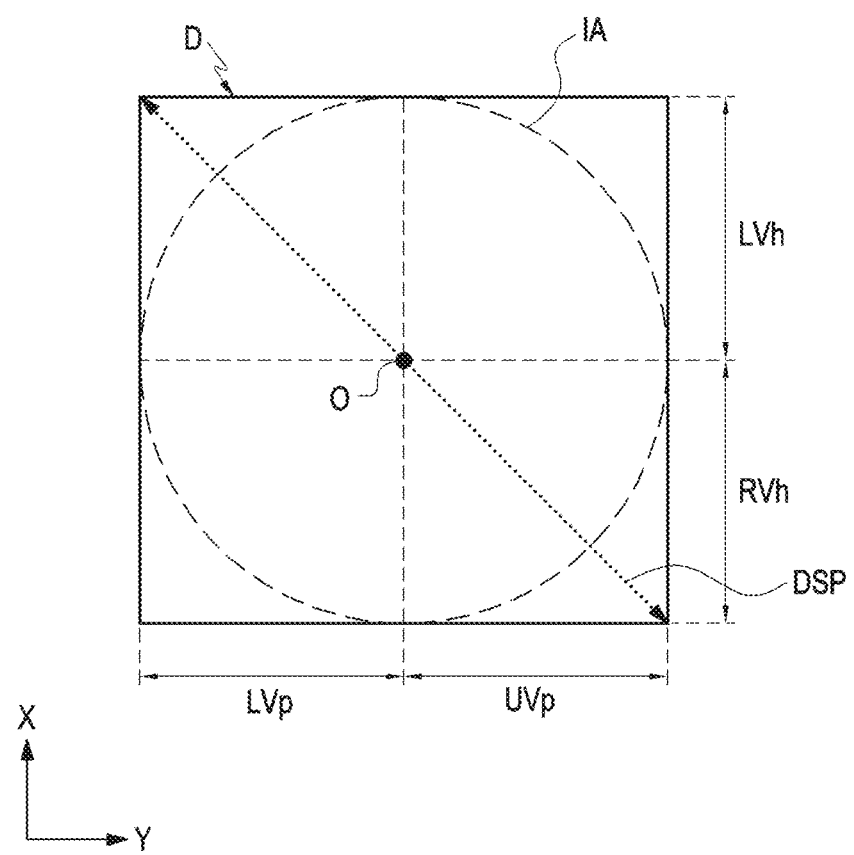
FIG. 7 is a graphical view illustrating fields of view for a display device/electronic device including the display device, according to an embodiment.
Figure 8:
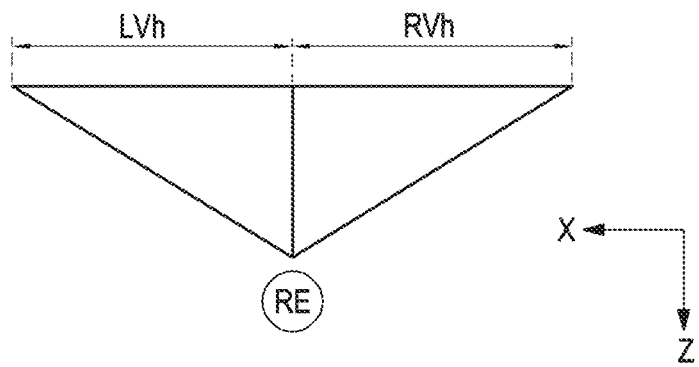
FIG. 8 is a graphical view illustrating fields of view (or viewing angles) of a display device/electronic device including the display device, according to an embodiment.

FIG. 7 is a view illustrating a display device 401 or 402 and/or a display D of an electronic device 400 including the display device, according to an embodiment. FIG. 8 is a view illustrating fields of view (or viewing angles) of a display device 401 or 402 and/or an electronic device 400 including the display device, according to an embodiment.

In an embodiment and referring to FIGS. 7 and 8, the display D may be aligned with an optical axis O, and an area visually recognized by a user (hereinafter, referred to as a "recognition area IA") may be the area indicated by "IA". For example, in FIG. 7, the reference numeral "D" of the display D may actually illustrate the active area of the display D, and the recognition area IA in the area indicated by "D" may an example of an area that can be visually recognized by a user from a predetermined viewpoint. Here, the description "the display D is aligned with the optical axis O" may refer to the state in which the optical axis O of the lens assembly LA is located at the point where diagonal lines of the display D cross each other. In FIG. 7, "DSP" may illustrate the diagonal length of the display D, and the maximum image height of the display D may be understood as being half of the diagonal length DSP of the display D.

In an embodiment and referring to FIG. 7 or FIG. 8, a plan view in which "RVh", "LVh", "LVp", and/or "UVp" illustrate half fields of view in a user's horizontal visual field or vertical visual field is shown. When the fields of view of the display devices 401 are 402 are about 110 degrees, the above-mentioned half fields of view may be understood as being about 55 degrees. However, depending on the specifications of the display D and/or the lens assembly LA, the fields of view or half fields of view of the display devices 401 and 402 may differ from the above-mentioned values. In an embodiment, "RVh" may illustrate the right field of view in the horizontal visual field, "LVh" may illustrate the left field of view in the horizontal visual field, "LVp" may illustrate the lower field of view in the vertical visual field, and/or "UVp" may illustrate an upper field of view in the vertical visual field. In an embodiment, as the display D is placed closer to the user's eyes, the display may provide a screen that matches the user's binocular visual field in implementing virtual reality or extended reality while being further miniaturized. In guiding or focusing a screen output from the display D to the user's eyes, the lens assembly LA may have a predetermined size or overall length.

In general, it is known that a user's horizontal monocular visual field is about 150 degrees, and when using both eyes, the user has a viewing angle in the range of about 200 degrees in the horizontal visual field. It is also known that the binocular visual field in which left and right eye viewing angles overlap is about 120 degrees. Thus, a person ordinarily skilled in the art will easily understand that the values mentioned regarding the viewing angles are merely illustrative and that there may be differences depending on the shape of a user's face or the relative positions and distance between the right and left eyes. The field of view that can be provided by the display device 401 or 402 through a combination of the display D and/or the lens assembly LA may be about 120 degrees. For example, the electronic device 400 may include a plurality of display devices 401 and 402 to satisfy a user's horizontal visual field using both eyes, a binocular visual field, and a monocular visual field of each of the user's left and right eyes.

Hereinbelow, an embodiment may be described in which the display D moves with respect to the lens assembly LA in order to secure an appropriate field of view depending on the deviation in the visual field between both eyes of a user depending on a user's physical conditions or a difference in wearing state. However, the invention is not limited to this, and the display D may be understood as being substantially fixed to the lens assembly LA. For example, in the state in which the center of the display D (e.g., the point where the diagonals cross) is positioned at a predetermined distance from the optical axis O of the lens assembly LA, the display D may be fixed with respect to the lens assembly LA. In the structure in which the display D is fixed to the lens assembly LA, the distance from the center of the display D to the optical axis O of the lens assembly LA may satisfy the conditions of [Mathematical expression 1], which will be described later. In an embodiment, assuming that a human's binocular field of view is within an angle of about 135 degrees, the first display device 401 and the second display device 402 may be combined to implement a viewing angle of about 140 degrees or more. In this embodiment, when a display D has a structure fixed with respect to the lens assembly LA and satisfies the conditions of [Mathematical expression 1] which will be described later, even if the display D does not have a structure that moves with respect to the lens assembly LA, the electronic device 400 may provide a good quality image, for example, an image with suppressed sense of heterogeneity in virtual reality or extended reality.

According to an embodiment, when providing a virtual image with a display device 401 or 402 which are disposed at a fairly close distance to a user's eye RE, the field of view of the display device 401 or 402 that matches the user's viewing angle may be calculated based on an appropriate size of a virtual image that can be identified by the user at a predetermined distance (e.g., eye box), the distance between the user's eye and the lens assembly LA (e.g., the lens surface of the closest lens) (e.g., eye relief), and/or the diameter of the lens assembly LA (e.g., the largest outer diameter among the outer diameters of the lenses of the lens assembly LA). When a field of view that matches the user's viewing angle is determined or calculated, the distance between the display D and the lens assembly LA and/or the size of the display D may be determined. This will be discussed with reference to the conditions presented through embodiments and equations which will be described later.

According to an embodiment, when the display devices 401 and 402 are placed at a fairly close distance to a user's eyes, such as in a head-mounted wearable device, there may be difficulty in harmonizing the fields of view of the display devices 401 and 402 with the user's visual field of view. Accordingly, as described above, the electronic device 400 may provide images for an augmented reality, virtual reality, mixed reality, and/or extended reality interface by including a plurality of display devices 401 and 402 which corresponds to both eyes of the user. In arranging the plurality of display devices 401 and 402, the positions of the display devices 401 and 402, specifications regarding the fields of view of the display devices 401 and 402, and/or sizes (or shapes) and weights of the display devices determined in consideration of a fit to the user may be considered.

According to an embodiment, when a viewing angle performance suitable for a user's binocular field of view is provided in arranging a plurality of displays D which corresponds to both eyes of the user in the electronic device 400, good quality virtual reality or extended reality may be implemented. The display devices 401 and 402 may be disposed adjacent to each other within the electronic device 400 or on the user's face while having a viewing angle of about 120 degrees or less (e.g., about 110 degrees or about 100 degrees). In this embodiment, when the fields of view of about 80 degrees or more overlap between the display devices 401 and 402, it is possible to suppress the sense of discomfort or heterogeneity that may be felt by the user when implementing virtual reality or extended reality. For example, by combining two display devices 401 and 402, the electronic device 400 may provide a screen in a field of view that is larger than the user's binocular visual field of view. As a result, it is possible to suppress the sense of heterogeneity felt by the user due to the screen provided in the implementation of virtual reality or extended reality.

According to an embodiment, the field of view of an image provided by a combination of the display devices 401 and 402 may be small compared to the user's binocular visual field of view. For example, even if a users' physical conditions (e.g., binocular visual fields of view in a horizontal plane) are different from each other, as the fields of view of the display devices 401 and 402 become larger, virtual reality images or extended reality images of a more realistic quality may be provided to various users. In an embodiment, even if the electronic device 400 satisfies a user's physical conditions regarding a user's binocular visual field of view, a satisfactory virtual reality image or extended reality image may not be provided to other users. According to an embodiment, in the electronic device 400 and/or in each display device 401 or 402, various fields of view may be implemented by disposing the display D to be movable with respect to the lens assembly LA. For example, by moving the display D in a direction crossing a screen output direction or in a direction crossing the optical axis O, the field of view of the electronic device 400 and/or the display device 401 or 402 may be adjusted. In an embodiment, the description "movement of the display D" may be understood as a horizontal movement S on a predetermined plane, or as a rotating or tilting motion around a predetermined axis.

In an embodiment, the display D may perform a horizontal movement S with respect to the lens assembly LA on a plane that is substantially perpendicular to the optical axis O. In another embodiment, the display D may perform a horizontal movement S in at least two directions on a plane crossing the optical axis O. In still another embodiment to be described later, a configuration in which the display D of the first display device 401 and the display D of the second display device 402 move toward or away from each other may be described as an example. However, without being limited to the directions mentioned in the embodiments, the directions of movement of the displays D with respect to the lens assemblies LA may be combined in various ways depending on the specifications and shape of the electronic device 400 to be actually manufactured. The movement of the displays D may be understood as an operation to adjust the fields of view of the electronic device 400 and/or the display devices 401 and 402, and in an embodiment, the movement of the displays D may be understood as adjusting the direction in which the screens output from the displays D are focused.

According to an embodiment, the displays D may be disposed to be substantially symmetrically within the electronic device 400 or on the user's face. In this embodiment, the movement of the displays D may be performed axisymmetrically. For example, the symmetry axis related to the axisymmetric movement of the displays D may be understood as being substantially parallel to the user's nose. In another embodiment, the symmetry axis related to the axisymmetric movement of the displays D may be understood as, for example, crossing the Z-axis or the X-axis of FIG. 13 and being parallel to the Y-axis.

Figure 9:
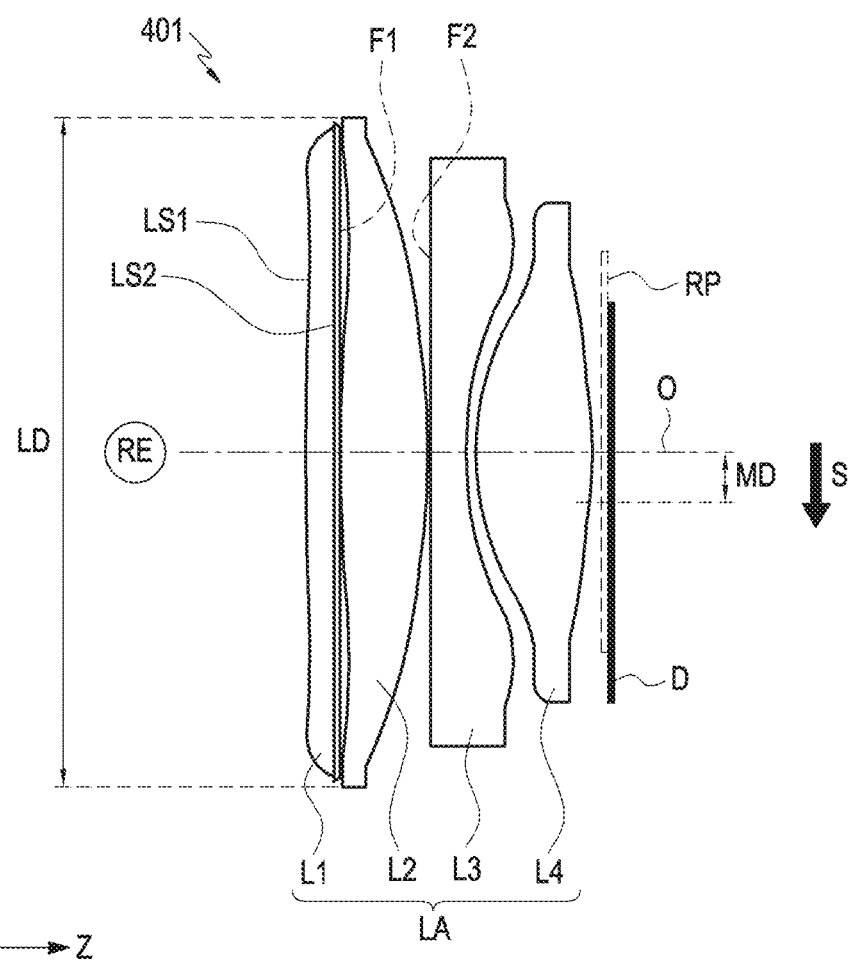
FIG. 9 is a graphical view illustrating the state in which a display is moved in a display device/electronic device including the display device, according to an embodiment.
Figure 10:
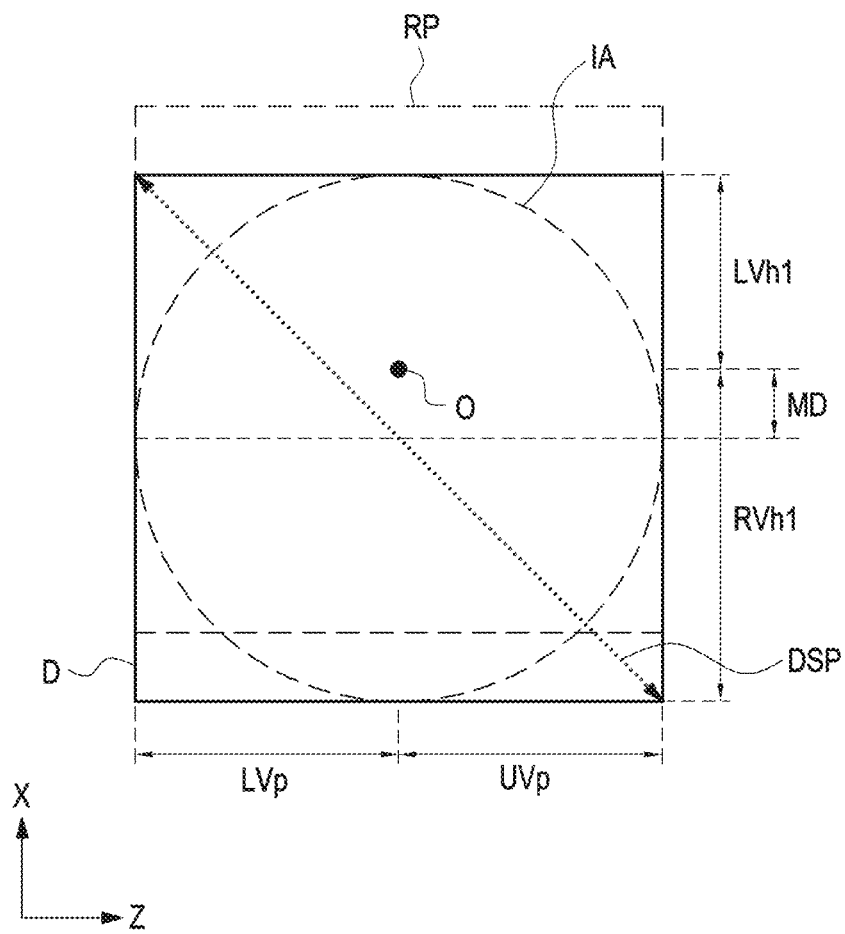
FIG. 10 is a graphical view illustrating the positions of the display before and after movement in the display device/electronic device including the display device, according to an embodiment.
Figure 11:
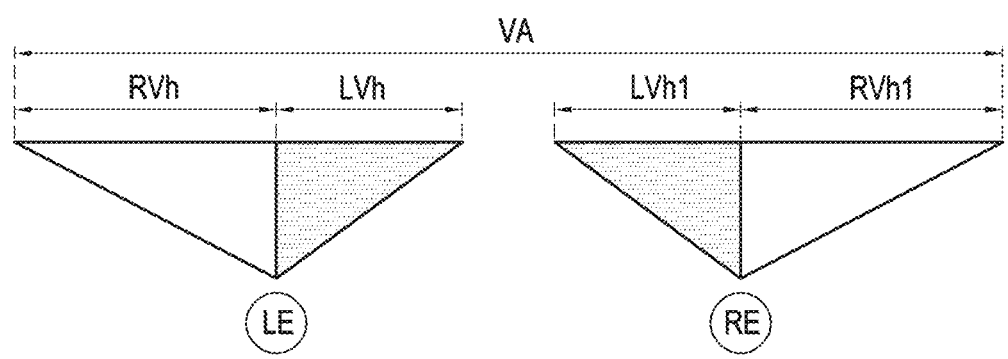
FIG. 11 is a graphical view illustrating fields of view (or viewing angles) of display devices/electronic device including the display devices depending on the movement of the displays, according to an embodiment.

FIG. 9 is a view illustrating the state in which a display D is moved in a display device 401 or 402 and/or an electronic device 400 including the display device, according to an embodiment. FIG. 10 is a view illustrating the positions of the display D before and after movement in the display device 401 or 402 and/or the electronic device 400 including the display device, according to an embodiment. FIG. 11 is a view illustrating fields of view (or viewing angles) of display devices 401 and 402 and/or an electronic device 400 including the display devices according to the movement of displays D, according to an embodiment.

In FIGS. 9 and 10, the reference numeral "RP" illustrates the position of the display D that is aligned with the optical axis O. For example, the display D may perform horizontal movement S in the first display device 401 toward or away from the display device 402. Due to this horizontal movement S, the half fields of view in the first display device 401 may change as follows. For example, the right field of view RVh1 may increase, and the left field of view LVh1 may decrease as much as the right field of view RVh1 increases. When the right field of view RVh1 increases in the first display device 401, the left field of view may increase in the second display device 402. As mentioned above, such an increase or decrease in the half field of view may be implemented when the displays D of the display devices 401 and 402 move. In an embodiment, when the display devices 401 and 402 have a field of view of about 110 degrees (e.g., a half field of view of about 55 degrees), depending on the relative movement of the displays D, the left field of view LVh1 and the right field of view RVh1 may increase to about 70 degrees and another one of the left field of view LVh1 and the right field of view RVh1 may decrease to about 40 degrees. In an embodiment, the displays D may move in the Y-axis direction of FIG. 13 with respect to the lens assemblies LA. In this case, the upper field of view UVp and/or the lower field of view LVp of the displays D may be adjusted.

According to an embodiment, the display devices 401 and 402 and/or the electronic device 400 including the display devices may satisfy the conditions presented through by [Mathematical expression 1] as follows:

$$0.02 \le \frac{MD}{DSP} \le 0.2.$$

where, "MD" may be the distance between an optical axis O and the center of a display D or the moving distance of the display D with respect to the optical axis O, measured along a direction perpendicular to the optical axis O. In an embodiment, "MD" may be understood as having a value of about "0 (zero)" when the center of the display D is aligned with the optical axis O. Additionally, "DSP" in may be the diagonal length DSP of the display D, as illustrated in FIG. 7 or FIG. 10. In an embodiment, the diagonal length DSP of the display D may be in the range of about 1 inch or more and about 3 inches or less, and the display D may move with respect to the lens assembly LA within the range that satisfies the conditions of [Mathematical expression 1] above.

According to an embodiment, as mentioned above, when the fields of view of two adjacent display devices 401 and 402 overlap each other by about 80 degrees, it is possible to suppress the sense of discomfort or heterogeneity when experiencing virtual reality or extended reality images while satisfying the user's viewing angle VA. Additionally, a calculated value of about "0.2", which is the maximum value among the calculated values of [Mathematical expression 1], may be understood as the maximum distance that the display D can move in the internal space of the electronic device 400, and in an embodiment, about "0.2" may be understood as a value that allows the viewing angles of two adjacent display devices 401 and 402 to be maintained in the state of overlapping each other by about 80 degrees or more.

According to an embodiment, when the display D provides images having a satisfactory quality to a user in the state of being aligned on the optical axis O, the display D does not substantially move with respect to the lens assembly LA. Nevertheless, a calculated value of about "0.02", which is described as the minimum value among the calculated values of [Mathematical expression 1], may be understood as the minimum value required to secure a significant difference in the field of view compared to the state in which the value of MD of [Mathematical expression 1] is 0 (zero). In an embodiment, a calculated value of about "0.02", which is described as the minimum value among the calculated values in [Mathematical expression 1], may have been presented in consideration of a user's request to secure images having an improved quality. In an embodiment, the display devices 401 and 402 and/or the electronic device 400 including the display devices 401 and 402 may be miniaturized or lightweighted to provide a comfortable fit by satisfying the conditions of [Mathematical expression 1]. In an embodiment, the display devices 401 and 402 and/or the electronic device 400 including the display devices 401 and 402 may increase a user's satisfaction in implementing virtual reality or extended reality by satisfying the conditions of [Mathematical expression 1].

According to an embodiment, the difference between the left field of view LVh and the right field of view RVh (or the upper field of view UVp and the lower field of view LVp) generated depending on the relative movement of the display D may be in the range of about 0 degrees or more and about 20 degrees or less. In an embodiment, in securing the overlapping field of view between two displays D at about 80 degrees or more, the smaller field of view between the left field of view LVh and the right field of view RVh in one display D may be about 40 degrees or more. For example, when two display devices 401 and 402 are combined to implement a field of view that matches the user's viewing angle VA, the left field of view LVh or the right field of view RVh in one display device 401 or 402 may have different values, and the smaller half angle of view between the left field of view LVh or the right field of view RVh may be about 40 degrees or more.

In an embodiment, the difference between the left field of view LVh and the right field of view RVh according to the relative movement of the display D, "DFOV", may be calculated by [Mathematical expression 2] given below. In an embodiment, when the center of a display D is aligned with the optical axis O of a lens assembly LA, the difference between the left field of view and the right view of field may be understood as being about "0 (zero)", and when the center of the display D is moved by the maximum distance allowed for the display D from the position where the center of the display D is aligned with the optical axis O of the lens assembly LA, half fields of view (e.g., the left field of view LVh or the right field of view RVh) may be understood as being 20 degrees or less. As discussed above, the difference between the left field of view LVh and the right field of view RVh according to the relative movement of the display D, "DFOV", may be calculated using [Mathematical expression 2] as follows:

$$DFOV = \frac{FOV}{2} * \frac{MD}{DSP/2},$$

where, in an embodiment, "FOV" may refer to a field of view implemented by a display device 401 or 402, for example, the lens assembly LA, "MD" may be the moving distance of the display D (or the distance from the optical axis O to the center of the display D), and "DSP" may be the diagonal length of the display D. For example, [Mathematical expression 2] may be understood as arithmetically defining the deviation in a half field of view (e.g., the difference between the left field of view LVh and the right field of view) which is caused by the movement of the display D. Although omitted in [Mathematical expression 2] above, a distortion coefficient may be further considered when calculating the deviation in a half field of view, where the distortion coefficient may be, for example, a coefficient in which the relative position of each pixel from the optical axis O (e.g., the distance from the optical axis O) measured on the display D when the left field of view LVh and the right field of view RVh are the same is taken into consideration. The distortion coefficient of each pixel may be roughly proportional to its distance from the optical axis O on the display D. For example, in the state in which the center of the display D is aligned with the optical axis O, the distortion coefficient of pixels located on the optical axis (O) is about "0 (zero)", in which there may be substantially no deviation between the left field of view LVh and the right field of view RVh.

According to an embodiment, when providing visual information to user recognition areas IA having the same size, it may be easy to miniaturize the displays D as the displays D are disposed closer to the user's eyes. In an embodiment, in order to dispose the lens assembly LA, a predetermined distance may be provided between the display D and the user's eyes, and at least three lenses L1, L2, L3, and L4 may each have a predetermined size (e.g., an outer diameter) for mechanical processing or shaping into a predetermined shape. In an embodiment, regardless of the sizes of the display D and the lens assembly LA, good aberration performance may be achieved when the display D and the lens assembly LA are placed with a sufficiently large distance therebetween. For example, when the display D and the lens assembly LA are placed with a sufficiently large distance therebetween, conditions are created in which light beams output from the display D can be incident in a substantially parallel fashion to the lens assembly LA and the optical axis O, so that the optical performance of the lens assembly LA or the display device 401 or 402 can be improved. However, in the electronic device 400 used while worn on a user's body, it may be difficult to secure good aberration performance by placing the display D away from the lens assembly LA.

According to an embodiment, the display devices 401 and 402 and/or the electronic device 400 may be easily miniaturized and have good optical performance (e.g., aberration control performance) by satisfying the conditions presented through [Mathematical expression 3] as given below:

$$0.2 \leq \frac{LD - DSP}{TTL} \leq 0.7,$$

where, in [Mathematical expression 3], "LD" is the outer diameter of the lens having the largest outer diameter among the at least three lenses L1, L2, L3, and L4, and which may be understood as the outer diameter of the second lens L2 in the illustrated embodiment, "DSP" is the diagonal length of the display D, and "TTL" is the total lens length, which may be the distance from the first lens surface LS1 (e.g., the eye side surface) of the first lens L1 to the display D. By satisfying the conditions presented through [Mathematical expression 3], the display device 401 or 402 may secure a good field of view, and an environment in which aberration control is easy may be provided by reducing the angle at which the light beams output from the display D are incident on the lenses or the inclination angle with respect to the optical axis O. In an embodiment, the display D may be implemented as an ultra-high definition display device having a diagonal length DSP range of about 1 inch or more and about 3 inches or less, and a resolution of about 2500*1400 pixels or more (e.g., about 3000*3000 pixels or more and/or about 3840*3840 pixels or more). In an embodiment, when the lens assembly LA satisfies the conditions of [Mathematical expression 3], it was identified that the above-mentioned conditions can be satisfied even if "LD" in [Mathematical expression 3] is applied as an effective diameter of the lens having the largest outer diameter among at least three lenses L1, L2, L3, and LA, as shown in Table 1 immediately below:

TABLE 1

| | LD | | | | [Mathematical expression 3] Calculated value |
| --- | --- | --- | --- | --- | --- |
| | Outer diameter | Effective diameter | DSP | TTL | |
| Lens assembly 1 | 44 | 41 | 34 | 18 | 0.389 |
| | | | 34 | 18 | 0.556 |
| Lens assembly 2 | 43 | 39 | 34 | 21 | 0.238 |
| | | | 34 | 20 | 0.450 |
| Lens assembly 3 | 43 | 39 | 34 | 21 | 0.238 |
| | | | 34 | 20 | 0.450 |
| Lens assembly 4 | 36 | 34 | 26 | 15 | 0.533 |
| | | | 26 | 15 | 0.667 |

According to an embodiment, the display D may have a diagonal length (DSP) of about 1.5 inches or less and a resolution of about 2500*1400 pixels or more (e.g., about 3000*3000 pixels or more and/or about 3840*3840 pixels or more). In this embodiment, the lens assembly LA may include four plastic lenses and may implement display devices 401 and 402 of about 20 mm or less. In an embodiment, when the display D has a diagonal length DSP of about 1.5 inches or less and a resolution of about 2500*1400 pixels or more (e.g., about 3000*3000 pixels or more and/or about 3840*3840 pixels or more) and is combined with four plastic lenses, it is possible to provide a field of view or an image that satisfies a user's binocular field of view while implementing the display device 401 or 402 of about 20 mm or less. In an embodiment, the value of "about 20 mm or less" mentioned as the length of the display device 401 or 402 refers to the total lens length, "TTL", in [Mathematical expression 3] which may be a value obtained by measuring the distance between the eye side surface of the first lens L1 (e.g., the first lens surface LS1) and the display D on the optical axis O. In an embodiment, when including at least three lenses L1, L2, L3, and L4, the total lens length or the length of the display device 401 or 402 may be about 10 mm or more.

Accordingly, when light beams are incident on the lenses at a small angle (or in substantially parallel) to the optical axis O, aberration control in the display device 401 or 402 and/or electronic device 400 may be easy. In an embodiment, when the display device 401 or 402 and/or the electronic device 400 including the display device satisfies the conditions of [Mathematical expression 3], the display D may be disposed adjacent to the lens assembly LA, and aberration control in the lens assembly LA may be easy. For example, [Mathematical expression 3] defines the angle at which light beams output from the display D are incident on the lenses in the miniaturized lens assembly LA and/or the display device 401 or 402, which makes it possible to suppress the sense of heterogeneity felt by users in implementing virtual reality or extended reality and provide images having an improved quality. In an embodiment, the displays D may be disposed side by side with each other and may move away from or closer to each other. In an embodiment, the description "moving away from each other" may be understood as the displays D moving away from the user's nose and toward the user's temples or cars. In an embodiment, the overlapping field of view of the first display device 401 and the second display device 402 may be adjusted depending on the movement of the displays D. In an embodiment, the display(s) D may move based on the relative position of the display(s) D and a user's eye RE, which is detected through a separate sensor, or based on a user input.

The above-described embodiments may be generally understood as illustrating the configuration of the display devices 401 and 402 and/or the electronic device 400 including the display devices in a user's horizontal visual field. However, the invention is not limited to the above-described embodiments, and the fields of view (or half fields of view UVp and LVp) in the vertical visual field may be adjusted or a field of view (or a half field of view) may be adjusted by the rotating or tilting motion of the display D. In an embodiment, an additional embodiment in which the fields of view (or half fields of view) are adjusted through the combination of the above-described movement in the horizontal direction (or movement in the vertical direction) and the rotating motion (or tilting motion) may be implemented. Adjustment of fields of view in a vertical visual field or adjustment of fields of view using a rotating motion (or tilting motion) will be discussed with reference to FIGS. 12 to 16. In discussing the embodiments to be described later, the electronic device 400 of FIG. 6 may be further referred to.

Figure 12:
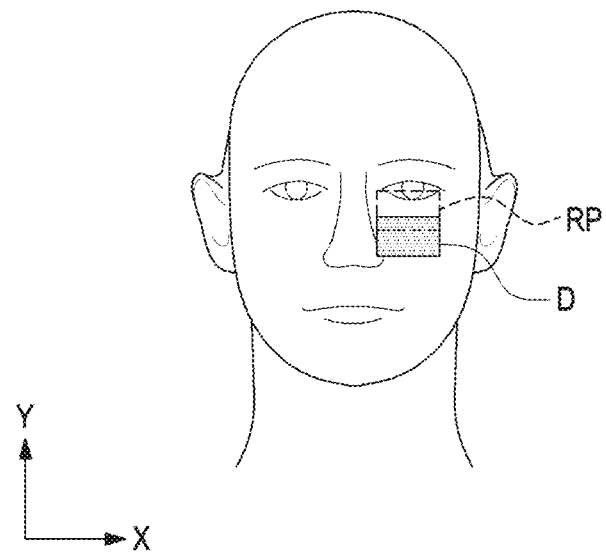
FIG. 12 is a front view of a user illustrating the state in which a display is moved in another direction in a display device/electronic device including the display device, according to an embodiment.

FIG. 12 is a view illustrating the state in which a display D is moved in another direction in a display device 401 or 402 and/or an electronic device 400 including the display device, according to an embodiment.

In an embodiment and referring to FIG. 12, by moving the display D in the vertical direction (e.g., the Y-axis direction) from a position aligned with the optical axis O (e.g., the position indicated by reference numeral "RP"), the upper field of view or lower field of view of the display device 401 or 401 and/or the electronic device 401 may be adjusted. In an embodiment, as in the illustrated embodiment, the configuration in which the display D is moved downward from the optical axis O alignment position RP may be exemplified. In an embodiment, the display D may be moved upward from the optical axis O alignment position RP.

In the above-described embodiments, it has been mentioned that the fields of view of the first display device 401 and the second display device 402 overlap by about 80 degrees or more. In the embodiment of FIG. 12, the horizontal distance between the first display device 401 and the second display device 402 may be substantially maintained at the initial configuration state. Thus, even if the display D moves in the vertical direction, the overlapping fields of view of the devices 401 and 402 may remain the same as the initial configuration state. In an embodiment, there may be a change in the heights of the displays D relative to the user's eyes due to the movement thereof in the vertical direction. In this embodiment, the distance between the displays D, which may be adjusted in proportion to the heights of the displays D relative to the user's eyes, may change. For example, the horizontal viewing angle may increase (or decrease) when the user's gaze is raised or lowered from a reference state. Thus, depending on the relative heights of the displays D with respect to the user's eyes RE, the distance between the displays D may be controlled.

Figure 13:
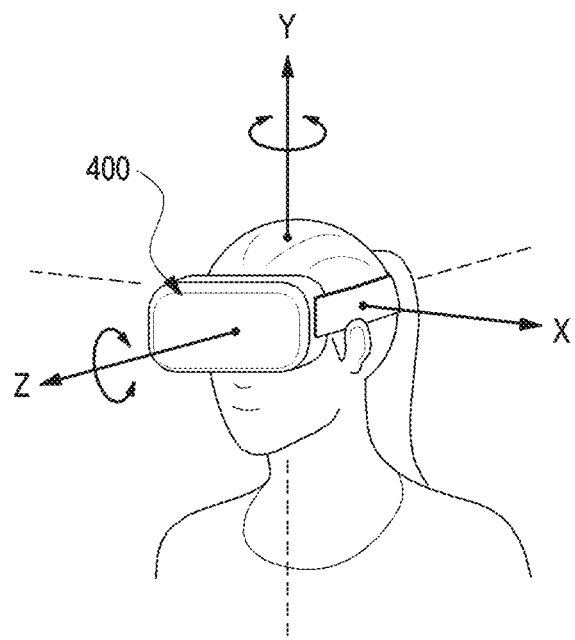
FIG. 13 is a perspective view illustrating the rotating or tilting motion of a display in a display device/electronic device including the display device, according to an embodiment.
Figure 14:
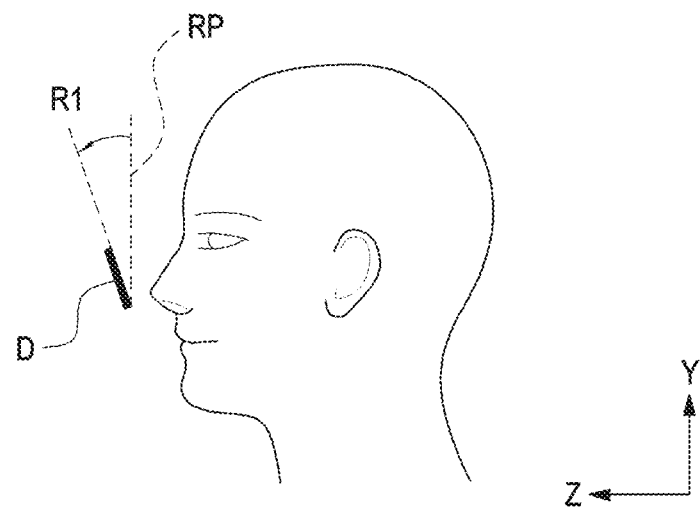
FIG. 14 is a side view of a user illustrating the state in which a display is rotated or tilted about the X-axis in a display device/electronic device including the display device, according to an embodiment.
Figure 15:
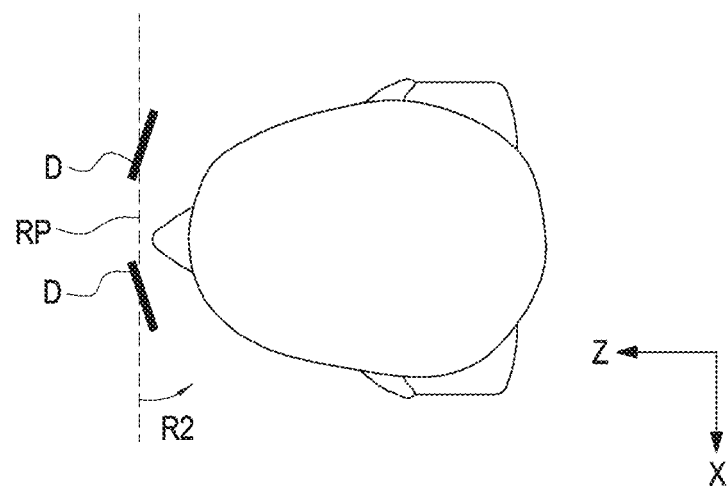
FIG. 15 is a top down view of a user illustrating the state in which displays are rotated or tilted about the Y-axis in a display device/electronic device including the display device, according to an embodiment.
Figure 16:
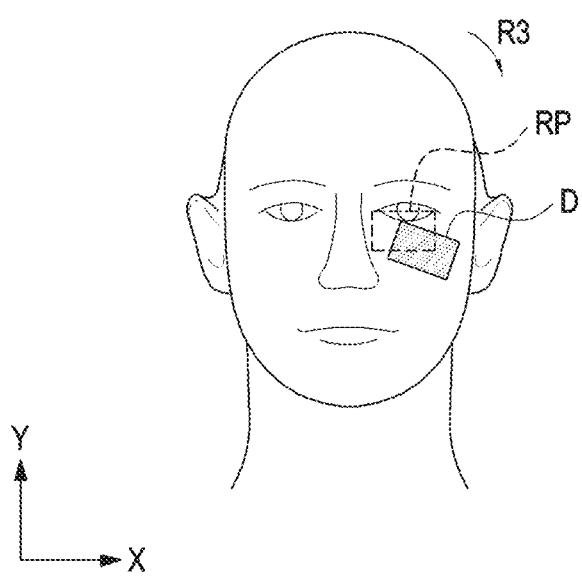
FIG. 16 is a front view of a user illustrating the state in which a display is rotated or tilted about the Z-axis in a display device/electronic device including the display device, according to an embodiment.

FIG. 13 is a view illustrating the rotating or tilting motion of the displays D in the display devices 401 and 402 and/or the electronic device 400 including the display devices, according to an embodiment. FIG. 14 is a view illustrating the state in which a display D is rotated or tilted about the X-axis in the display device 401 or 402 and/or the electronic device 400 including the display devices, according to an embodiment. FIG. 15 is a view illustrating the state in which the displays D are rotated or tilted about the Y-axis in the display devices 401 and 402 and/or the electronic device 400 including the display devices, according to an embodiment. FIG. 16 is a view illustrating the state in which a display D is rotated or tilted about the Z-axis in the display device 401 or 402 and/or the electronic device 400 including the display devices, according to an embodiment.

In an embodiment and referring to FIGS. 13 to 16, the rotating or tilting motion of the displays D, is illustrated, in which, in FIG. 13, for example, the X-axis may indicate the horizontal direction on the user's face in which the user's eyes are aligned, the Y-axis may indicate the vertical direction on the user's face, and the Z-axis may indicate the user's gaze direction. When the electronic device 400 is worn on a user's face, the displays D may provide image information to the user by outputting a screen directed in a first direction, for example, the −Z direction. In an embodiment, the displays D may be rotated or tilted about at least one of the X-axis, Y-axis, and/or Z-axis. In an embodiment, the rotating or tilting motion of the displays D about the X-axis may be understood as a pitching motion R1, the rotating or tiling motion of the displays D about the Y-axis may be understood as a yawing motion R2, and/or the rotating or tilting motion of the displays D about the Z-axis may be understood as a rolling motion R3. The rotating or tilting motions R1, R2, and R3 of the displays D may be selectively combined with the horizontal movement S of the displays D as illustrated in FIG. 9 or with the vertical movement of the displays D as illustrated in FIG. 12.

According to an embodiment, the pitching motion R1 of the displays D may implement a field of view adjustment function similar to the vertical movement of the displays D as illustrated in FIG. 12. In an embodiment, the yawing motion R2 of the displays D may implement a field of view adjustment function similar to the horizontal movement of the displays D as illustrated in FIG. 9. In an embodiment, the rolling motion R3 of the display D may implement a view angle adjustment function similar to a combination of vertical movement or horizontal movement of the displays D. In an embodiment, this pitching motion R1, the yawing motion R2, and/or the rolling motion R3 may be implemented within an angle of about six degrees from the positions of the displays D illustrated in FIG. 6 and/or the optical axis O alignment position RP in FIG. 12.

According to an embodiment, when the internal spaces of the display devices 401 and 402 (and/or the electronic device 400) are so narrow that the maximum value of about 0.2 among the calculated values according to [Mathematical expression 1] cannot be tolerated, it may achieve a field of view adjustment structure implemented through [Mathematical expression 1] by rotating or tilting the displays D. In an embodiment, the display devices 401 and 402 (and/or the electronic device 400) may perform an additional rotating or tilting motion while satisfying the conditions of [Mathematical expression 1] in horizontal movement and/or vertical movement. For example, when a plurality of display devices 401 and 402 are combined to implement a field of view that satisfies a user's binocular visual field of view, an additional rotating or tilting motion may further expand the range of adjustment of the field of view (or a half field of view). When expanding the range of adjustment of a field of view or a half field of view, it should be noted that the field of view implemented by overlapping the first display device 401 and the second display device 402 should be maintained at about 80 degrees or more. In an embodiment, the fields of view of the display devices 401 and 402 may be adjusted by selectively combining the horizontal movement of FIG. 9, the vertical movement of FIG. 12, and/or the rotating motions of FIGS. 13 to 16.

As described above, a display device (e.g., the display module 160 in FIG. 1 or the display devices 401 and 402 in FIG. 6) and/or an electronic device (e.g., the electronic device 101 or 400 in FIG. 1 or FIG. 6 and/or a wearable electronic device 200 or 300 in FIGS. 2 to 5), according to an embodiment, may implement a field of view that satisfies a user's viewing angle when outputting virtual reality images or extended reality images while being miniaturized. For example, a display device and/or an electronic device including the display device, according to an embodiment, may reduce user fatigue by providing a comfortable fit and by suppressing the sense of heterogeneity felt by a user from viewing virtual reality images or extended reality images. According to an embodiment, when a display (e.g., the displays D or 331 in FIGS. 2 to 6) is disposed to be movable with respect to a lens assembly (e.g., the lens assembly LA in FIG. 6), even if there is a deviation in binocular visual field of view due to physical differences of individual users, virtual reality images or extended reality images may be provided at a field of view suitable for each individual user.

According to an embodiment, a display device (e.g., the display module 160 in FIG. 1 or the display devices 401 and 402 in FIG. 6) may include a display (e.g., the display D or 331 in FIGS. 2 to 6) configured to output a screen output along a first direction, and a lens assembly (e.g., the lens assembly LA in FIG. 6) including at least three lenses (e.g., the lenses L1, L2, L3, and L4 in FIG. 6) arranged sequentially along an optical axis (e.g., the optical axis O in FIG. 6) and configured to focus or guide the screen output from the display in a predetermined direction or to a predetermined position. In an embodiment, the lens assembly may be configured to reflect the screen output from the display at least twice between the first lens (e.g., the first lens L1 in FIG. 6) which is disposed farthest from the display among the at least three lenses and a nth lens (e.g., the fourth lens L4 in FIG. 6) which is disposed closest to the display among the at least three lenses. In an embodiment, the display may be disposed to be movable in a direction crossing the first direction or in a direction crossing the optical axis. In an embodiment, the display device may satisfy the following [Conditional expression 1] regarding the diagonal length DSP of the display and the distance MD from the optical axis to the center of the display measured along a direction perpendicular to the optical axis. [Conditional expression 1] is given as:

$$0.02 <= MD/DSP <= 0.2.$$

According to an embodiment, the lens assembly may include at least one of a quarter wave plate (e.g., the quarter wave plates 203 and 205 in FIG. 5), at least one reflective polarizer (e.g., the reflective polarizer 202 in FIG. 5), or a beam splitter (e.g., the beam splitter 204 in FIG. 5) disposed between the first lens and the nth lens.

According to an embodiment, the first lens may include a first lens surface (e.g., the first lens surface LS1 in FIG. 6) and a second lens surface (e.g., the second lens surfaces LS2 in FIG. 6) disposed opposite to the first lens surface while being disposed to face the display. In an embodiment, the display device may further satisfy the following [Conditional expression 2] regarding the largest outer diameter LD among the outer diameters of the at least three lenses, the diagonal length of the display, and the distance TTL as measured from the optical axis from the display to the first lens surface of the first lens. [Conditional expression 2] is given as:

$$0.2 <= (LD - DSP)/TTL <= 0.7.$$

According to an embodiment, the above-described display device may be configured to adjust a difference between a left field of view and a right field of view in a range of about 0 degrees or more and about 20 degrees or less.

According to an embodiment, the smaller field of view between the left field of view and the right field of view may be about 40 degrees or more.

According to an embodiment, the first lens may include a first lens surface and a second lens surface disposed opposite to the first lens surface while being disposed to face the display. In an embodiment, the distance measured on the optical axis from the first lens surface to the display may be about 10 mm or more and about 20 mm or less.

According to an embodiment, the diagonal length of the display may be in a range of about 1 inch or more and about 3 inches or less.

According to an embodiment, the display may be configured to rotate or tilt with respect to the lens assembly.

According to an embodiment, the display may be configured to move in at least two directions on a plane crossing the optical axis.

According to an embodiment, the above-described display device may include a pair of displays disposed side by side with each other, and a pair of lens assemblies disposed side by side with each other.

According to an embodiment, the pair of displays may be configured to move away from or toward each other.

According to an embodiment, the above-described display device may be configured to adjust a difference between a left field of view and a right field of view in a range of about 0 degrees or more and about 20 degrees or less. In this embodiment, the smaller field of view between the left field of view and the right field of view may be about 40 degrees or more.

According to an embodiment, the display may have a resolution of about 3000*3000 pixels or more.

According to an embodiment, an electronic device (e.g., the electronic device 101 or 400 in FIG. 1 or FIG. 6 and/or the electronic device 200 or 300 in FIGS. 2 to 5) may include a first display device (e.g., the first display device 401 in FIG. 6), and a second display device (e.g., the second display device 402 in FIG. 6) which is disposed on one side of the first display device. At least one of the first display device and the second display device may include a display (e.g., the display D or 331 in FIGS. 2 to 6) configured to output a screen output along a first direction, and a lens assembly (e.g., the lens assembly LA in FIG. 6) including at least three lenses (e.g., the lenses L1, L2, L3, and LA in FIG. 6) arranged sequentially along an optical axis (e.g., the optical axis O in FIG. 6) and configured to focus or guide the screen output from the display in a predetermined direction or to a predetermined position. In an embodiment, the lens assembly may be configured to reflect the screen output from the display at least twice between the first lens (e.g., the first lens L1 in FIG. 6) which is disposed farthest from the display among the at least three lenses and an nth lens (e.g., the fourth lens L4 in FIG. 6) which is disposed closest to the display among the at least three lenses. In an embodiment, the display may be disposed to be movable in a direction crossing the first direction or in a direction crossing the optical axis. In an embodiment, the electronic device, the first display device, and/or the second display device may satisfy the following [Conditional expression 1] and [Conditional expression 2] given by:

$$0.02 <= MD/DSP <= 0.2, \quad \text{[Conditional expression 1]},$$

and $$0.2 <= (LD - DSP)/TTL <= 0.7, \quad \text{[Conditional expression 2]},$$

where, "DSP" may be the diagonal length of the display, "MD" may be the distance from the optical axis to the center of the display as measured along a direction perpendicular to the optical axis, "LD" may be the largest outer diameter among outer diameters of the at least three lenses, and "TTL" may be the distance from the display to a first lens surface (e.g., the first lens surface LS1 in FIG. 6) of the first lens on the optical axis, wherein the first lens surface may refer to a surface which is disposed opposite to a surface (e.g., the second lens surface LS2 in FIG. 6) of the first lens facing the display.

According to an embodiment, the first display device or the second display device may be configured to adjust a difference between a left field of view and a right field of view in a range of about 0 degrees or more and about 20 degrees or less by moving the display.

According to an embodiment, the smaller field of view between the left field of view and the right field of view may be about 40 degrees or more.

According to an embodiment, the first lens may include a first lens surface and a second lens surface disposed opposite to the first lens surface while being disposed to face the display. In an embodiment, the distance measured on the optical axis from the first lens surface to the display may be about 10 mm or more and about 20 mm or less.

According to an embodiment, the diagonal length of the display may be 1 inch or more and 3 inches or less.

According to an embodiment, the display may be configured to rotate or tilt with respect to the lens assembly.

According to an embodiment, a display included in the first display device and a display included in the second display device may be configured to move away from or toward each other.

According to an embodiment, the lens assembly may include at least one of a quarter wave plate (e.g., the quarter wave plates 203 and 205 in FIG. 5), at least one reflective polarizer (e.g., the reflective polarizer 202 in FIG. 5), or a beam splitter (e.g., the beam splitter 204 in FIG. 5) disposed between the first lens and the nth lens.

Although embodiments of the invention have been illustrated and described, it should be appreciated that the embodiment does not limit the invention, but is provided for the sake of illustration. It will be apparent to those skilled in the art that various changes may be made to the form and details of the invention without departing from the overall scope of the invention.

The invention claimed is:

1. A display device, comprising:
    a display configured to output a screen output along a first direction; and
    a lens assembly including at least three lenses arranged sequentially along an optical axis and configured to focus or guide the screen output in a predetermined direction or to a predetermined position, wherein the lens assembly is configured to reflect the screen output at least twice between a first lens, among the at least three lenses, disposed farthest from the display and a nth lens, among the at least three lenses, disposed closest to the display,
    wherein the display is disposed to be movable in a direction crossing the first direction or in a direction crossing the optical axis, and
    wherein the display device satisfies a [Conditional expression 1] regarding a diagonal length (DSP) of the display and a distance (MD) from the optical axis to a center of the display measured along a direction which is perpendicular to the optical axis,
    wherein the [Conditional expression 1] is given by 0.02<=MD/DSP<=0.2.

2. The display device of claim 1, wherein the lens assembly includes at least one of a quarter wave plate, a reflective polarizer, or a beam splitter disposed between the first lens and the nth lens.

3. The display device of claim 1, wherein the first lens includes a first lens surface and a second lens surface, wherein the second lens surface is disposed opposite to the first lens surface to face the display, and wherein the display device further satisfies a [Conditional expression 2] regarding a largest outer diameter (LD) among outer diameters of the at least three lenses, the diagonal length (DSP) of the display, and a distance (TTL) measured, on the optical axis, from the display to the first lens surface, wherein the [Conditional expression 2] is given by $0.2 \leq (LD-DSP)/TTL \leq 0.7$.

4. The display device of claim 1, wherein the display device is configured to adjust a difference between a left half field of view and a right half field of view in a range of about 0 degrees or more and about 20 degrees or less by moving the display.

5. The display device of claim 4, wherein a smaller field of view among the left half field of view and the right half field of view is about 40 degrees or more.

6. The display device of claim 1, wherein the first lens includes a first lens surface and a second lens surface, wherein the second lens surface is disposed opposite to the first lens surface to face the display, and wherein a distance, measured on the optical axis, from the first lens surface to the display is about 10 mm or more and about 20 mm or less.

7. The display device of claim 1, wherein the diagonal length (DSP) of the display is in the range of about 1 inch or more and about 3 inch or less.

8. The display device of claim 1, wherein the display is configured to rotate or tilt with respect to the lens assembly.

9. The display device of claim 1, wherein the display is configured to move in at least two directions on a plane crossing the optical axis.

10. The display device of claim 1, comprising a pair of displays disposed side by side to each other and a pair of lens assemblies disposed side by side to each other.

11. The display device of claim 10, wherein the pair of displays are configured to move in a direction directed away from or toward each other.

12. The display device of claim 1, wherein the display has a resolution of about 3000*3000 pixels or higher.

13. An electronic device comprising:
a first display device; and
a second display device, wherein the second display device is disposed on one side of the first display device,
wherein at least one of the first display device or the second display device comprises:
a display configured to output a screen output along a first direction; and
a lens assembly (LA) comprising at least three lenses arranged sequentially along an optical axis and configured to focus or guide the screen output from the display, in a predetermined direction or to a predetermined position, the lens assembly configured to reflect the screen output from the display at least twice between a first lens among the at least three lenses disposed farthest from the display and a nth lens among the at least three lenses disposed closest to the display,
wherein the display is disposed to be movable in a direction crossing the first direction or in a direction crossing the optical axis,
wherein the display satisfies a [Conditional expression 1] and a [Conditional expression 2],
wherein the [Conditional expression 1] is given by $0.02 \leq MD/DSP \leq 0.2$, and wherein the [Conditional expression 2] is given by $0.2 \leq (LD-DSP)/TTL \leq 0.7$, where DSP is a diagonal length of the display, MD is a distance from the optical axis to a center of the display measured along a direction that is perpendicular to the optical axis, LD is a largest outer diameter among outer diameters of the at least three lenses, and TTL is a distance from the display to a first lens surface of the first lens on the optical axis, wherein the first lens surface is disposed opposite to a surface of the first lens facing the display.

14. The electronic device of claim 13, wherein the first display device or the second display device is configured to adjust a difference between a left field of view and a right field of view in a range of about 0 degrees or more and about 20 degrees or less by moving the display.

15. The electronic device of claim 14, wherein a smaller field of view between the left field of view and the right field of view is about 40 degrees or more.

16. The electronic device of claim 13, wherein the first lens comprises a first lens surface and a second lens surface, wherein the second lens surface is disposed opposite to the first lens surface to face the display, and wherein a distance measured on the optical axis from the first lens surface to the display is in the range of about 10 mm or more and about 20 mm or less.

17. The electronic device of claim 13, wherein the diagonal length DSP of the display is in the range of about 1 inch or more and about 3 inches or less.

18. The electronic device of claim 13, wherein the display is configured to rotate or tilt with respect to the lens assembly.

19. The electronic device of claim 13, wherein a display included in the first display device and a display included in the second display device are configured to move away from or toward each other.

20. The electronic device of claim 13, wherein the lens assembly comprises at least one of a quarter wave plate, a reflective polarizer, or a beam splitter disposed between the first lens and the $n^{th}$ lens.

* * * * *